June 15, 1965 W. E. BRAINARD 3,188,892
APPARATUS FOR AUTOMATICALLY SETTING UP A PROGRAM IN
A MULTIPLE SPINDLE MACHINE TOOL
Filed Oct. 31, 1960 9 Sheets-Sheet 1

INVENTOR.
Wallace E. Brainard
BY Cyril M. Hajewski
Attorney

INVENTOR.
Wallace E. Brainard

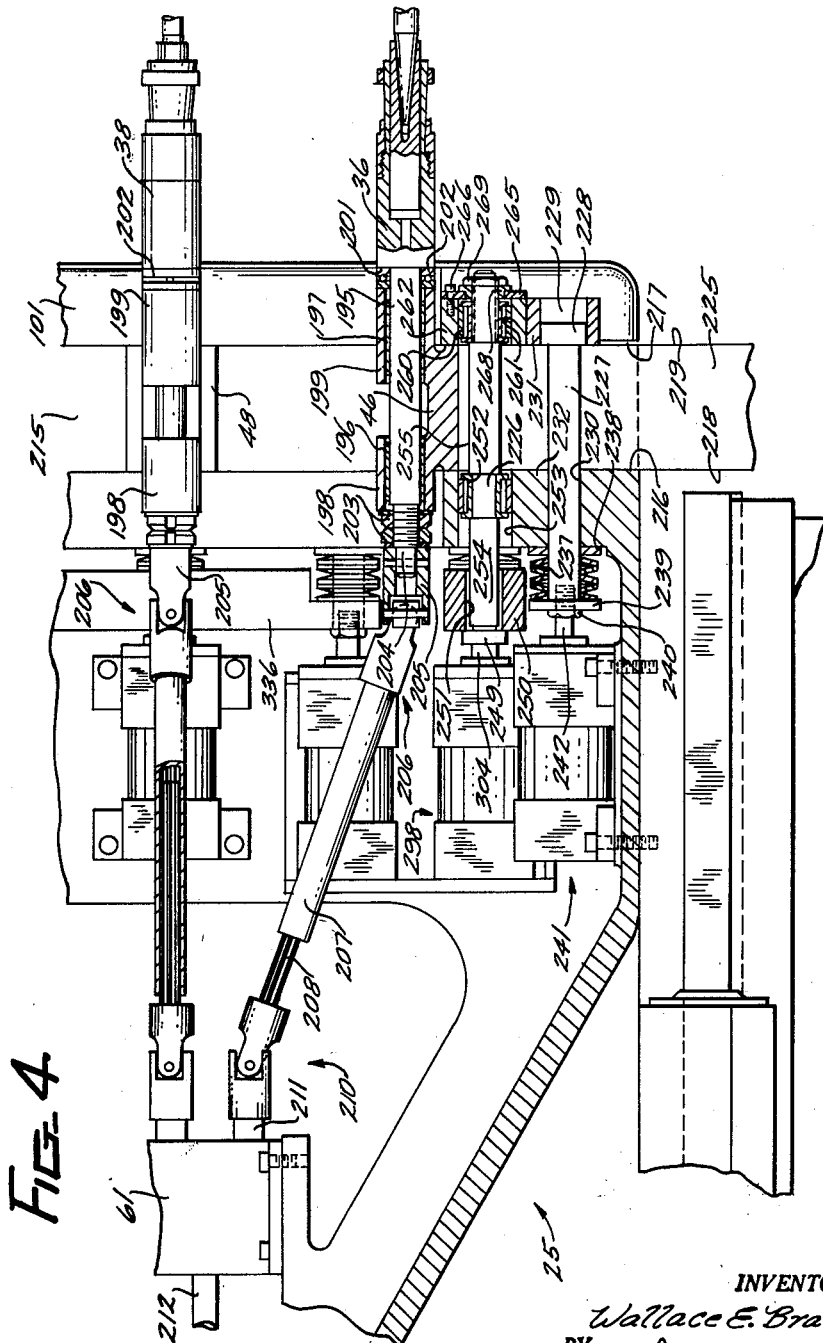

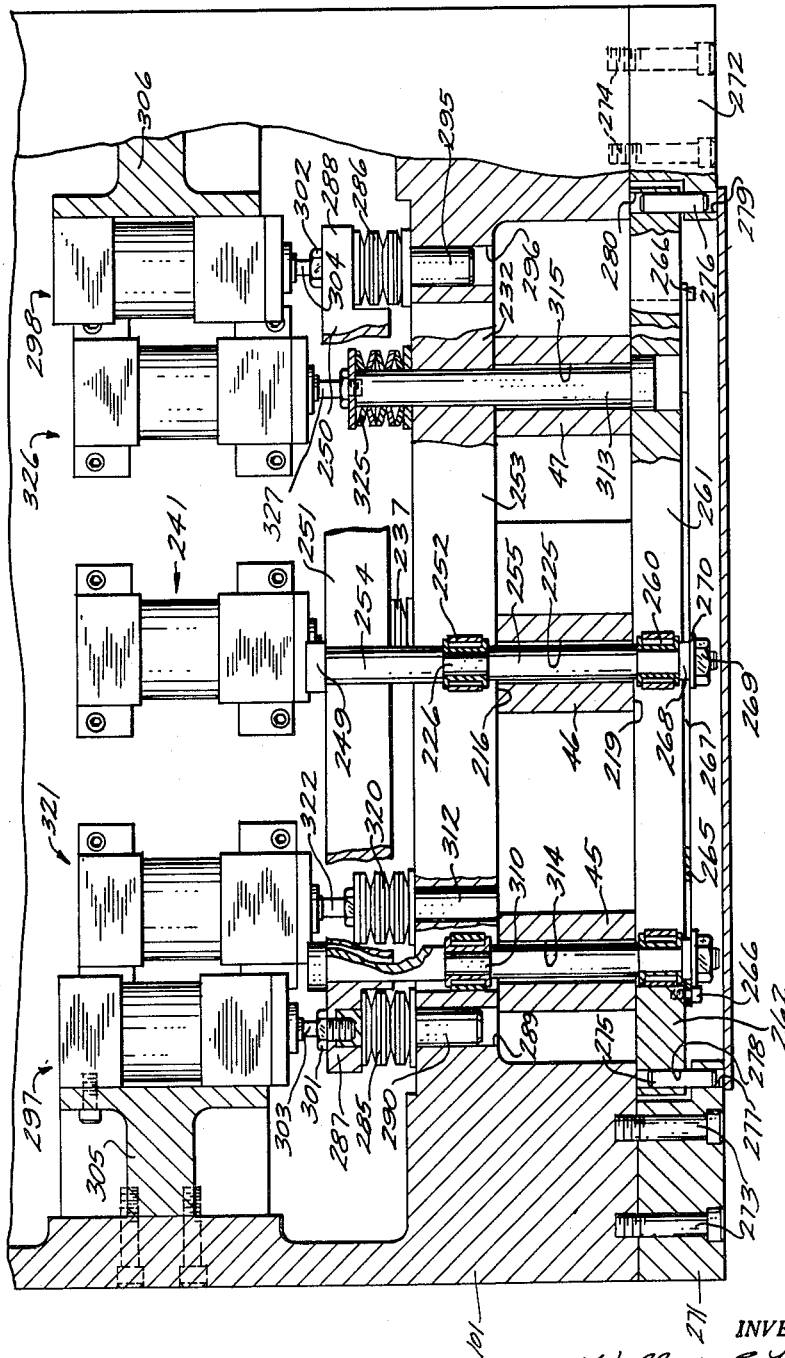

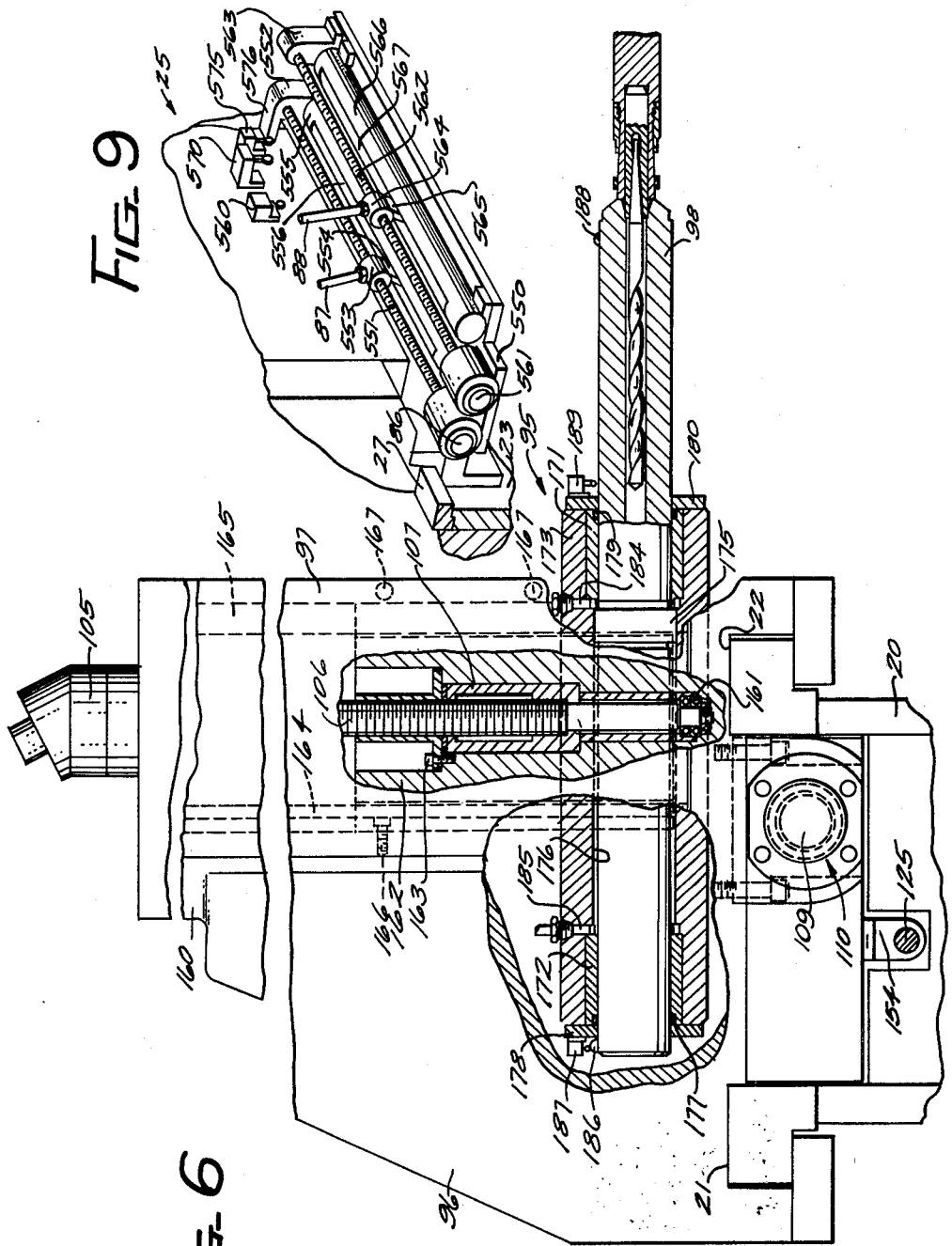

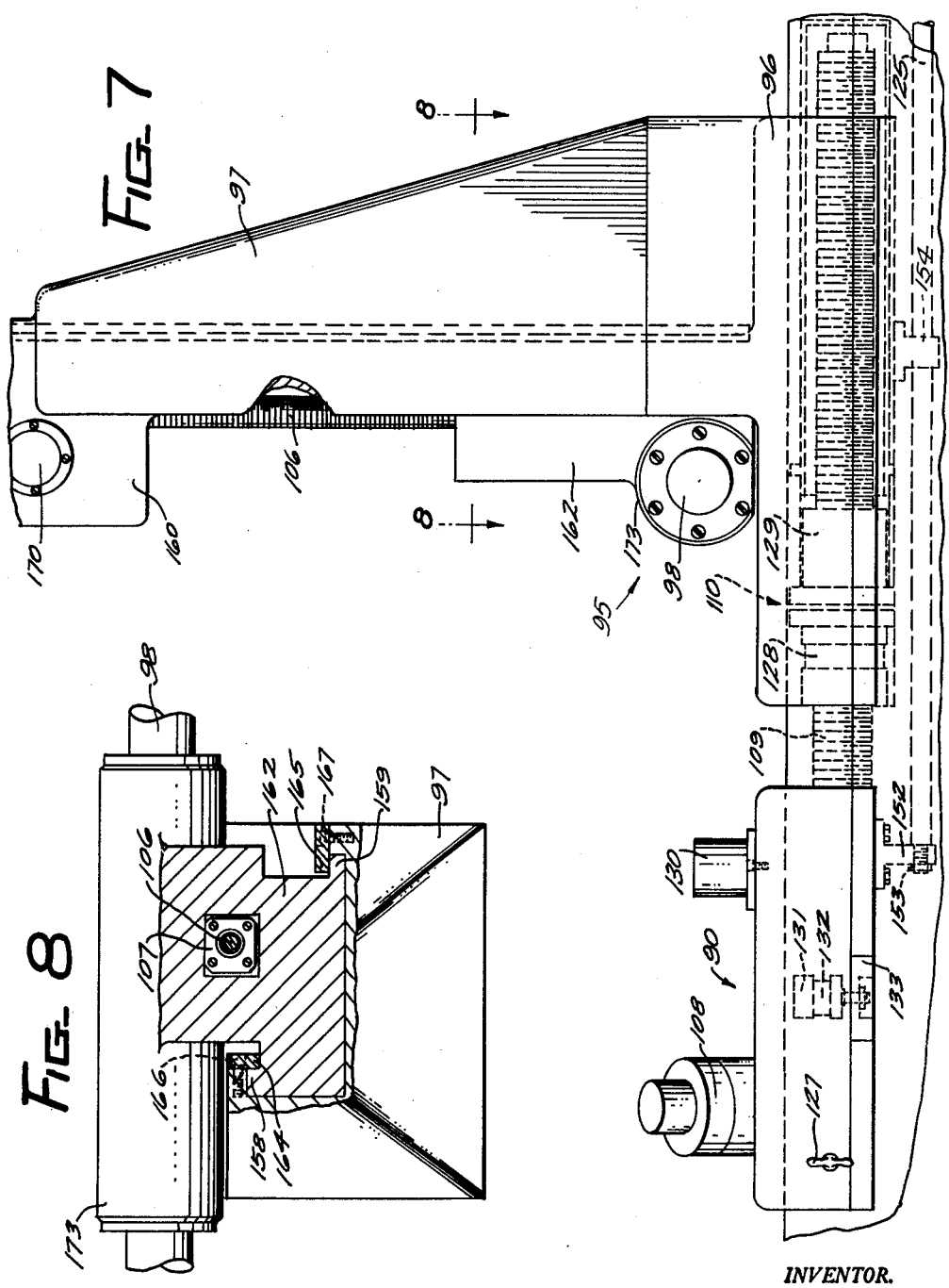

United States Patent Office 3,188,892
Patented June 15, 1965

3,188,892
APPARATUS FOR AUTOMATICALLY SETTING UP A PROGRAM IN A MULTIPLE SPINDLE MACHINE TOOL
Wallace E. Brainard, Milwaukee, Wis., assignor to Kearney & Trecker Corporation, West Allis, Wis., a corporation of Wisconsin
Filed Oct. 31, 1960, Ser. No. 66,067
14 Claims. (Cl. 77—24)

The present invention relates generally to machine tools and more particularly to an improved multiple spindle machine tool provided with automatic means for laterally positioning the several spindle to predetermined positions and for setting the machine cycle.

It is a general object of the present invention to provide an improved multiple spindle machine tool.

Another object of the present invention is to provide an improved multiple spindle machine tool which operates automatically in response to information furnished to a control circuit.

Another object of the present invention is to provide a multiple spindle machine tool which can be rapidly set up for performing different machining operations.

Another object is to provide an improved multiple spindle drilling machine with automatically controlled power means for moving the spindles laterally to accurately locate them relative to each other in predetermined patterns for drilling a plurality of holes simultaneously.

Another object of the present invention is to provide a setup mechanism that is regulated by a single control circuit for setting a plurality of machine tools by adjusting their operating cycle and respositioning the spindles of the multiple spindle machine tools into different patterns.

Another object is to provide an automatically operated setup mechanism for adjusting the cycle of operation of a machine tool in accordance with the data furnished to a control circuit that regulates the operation of the setup mechanism.

Another object of the present invention is to provide an automatically operated setup mechanism which is regulated by a single control circuit for setting a plurality of different machines in a production line.

Another object is to provide an improved multiple spindle machine tool which can be set up rapidly and extremely accurately while requiring a minimum degree of skill and effort on the part of the operator.

According to this invention, the improved multiple spindle machine tool is operated automatically in accordance with a predetermined program and comprises a spindle head equipped with a plurality of tool carrying spindles that are rotated by power and which are individually movable laterally for adjusting their positions relative to each other to change their arrangement for performing different multiple spindle machining operations. After a new set of tools has been installed in the spindle head, it may be necessary to move the spindles laterally for adjusting their spacing to accommodate the machining operation which is to be performed. Thus, if the tools are a set of drills for performing a multiple spindle drilling operation, the drills must be spaced laterally in a definite pattern to conform to the spacing of the holes that are to be drilled in the workpiece. To this end, an automatic setup mechanism is provided which is movable into alignment with the spindle head for positioning the several spindles of the spindle head in response to information that is presented to a control circuit. The setup mechanism includes a support that carries a movable tubular spindle grip which is mounted with its axis parallel to the axes of the spindles. The spindle grip is movable axially so that it may be advanced into engagement with any one of the spindles and is also movable laterally along two axes for automatically moving the engaged spindle to a predetermined position by operation of the control circuit in response to the information fed to the control circuit. The machine therefore operates automatically to individually position the several spindles of the spindle head in the pattern required to accommodate the multiple spindle machining operation which is to be performed by the new set of tools.

The automatic setup mechanism is also arranged to cooperate with a cycle control box for automatically establishing the cycle of operation of the spindle head in response to information furnished to a control circuit. This includes setting the feed rate of the spindle head as well as the rate of rotation of the spindles. The automatic setup mechanism also adjusts the cycle control box to regulate the depth of the feeding movement and the amount of the spindle head movement that is to be travelled at a rapid rate and sets the operating cycle for performing tapping operations if desired. Other operations of the machine can be established and adjusted by the functioning of the automatic setup mechanism.

The foregoing and other objects of this invention, which will become more fully apparent from the following detailed description, may be achieved by means of the exemplifying apparatus depicted in and set forth in this specification in connection with the accompanying drawings, in which:

FIG. 4 is a fragmentary view partly in side elevation and partly in vertical section taken along the plane represented by the line 4—4 in FIG. 3 to illustrate the mounting of the spindles and their associated support arms in the spindle head and the arrangement of their cooperating clamping elements;

FIG. 5 is a view partly in plan and partly in horizontal section taken along the plane represented by the line 5—5 in FIG. 3 to illustrate the clamping elements for a group of three spindles;

FIG. 6 is a detail view substantially in side elevation depicting the automatic setup assembly with parts being broken away to show the internal operating mechanism;

FIG. 7 is a view in front elevation illustrating the automatic setup mechanism shown in FIG. 6 along with its cooperating drive unit;

FIG. 8 is a view partly in plan and partly in horizontal section taken along the plane represented by the line 8—8 in FIG. 7 and turned through 90°;

FIG. 9 is a fragmentary perspective view showing the mechanism mounted on the side of the bed extension, beneath the spindle head, for automatically setting a pair of dogs which actuate the illustrated limit switches to adjust the feed cycle of the spindle head;

Figure 11:
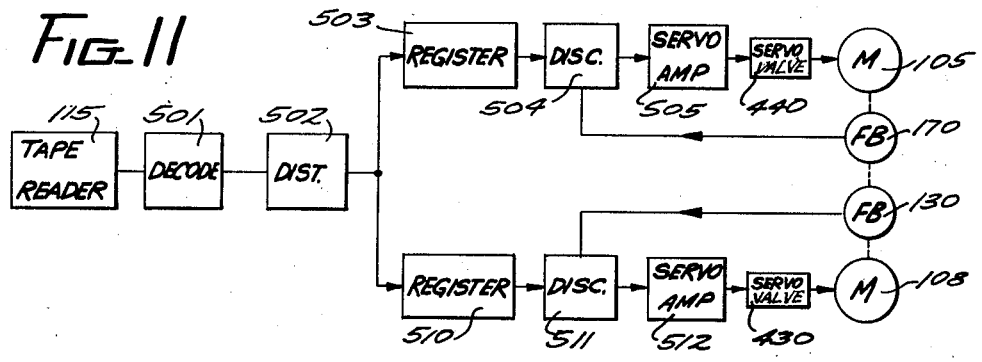
FIG. 11 is a diagrammatic view of the tape control circuit for controlling the operation of the automatic setup mechanism.
Figure 12:
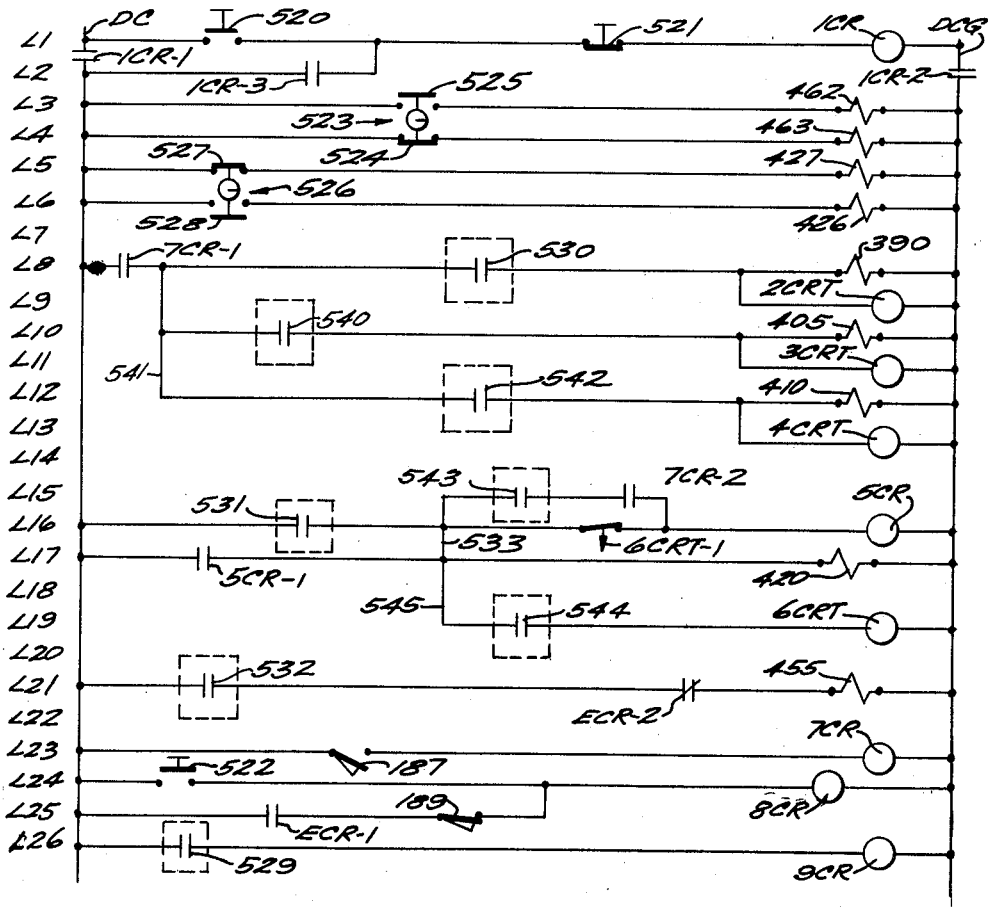
Figure 13:
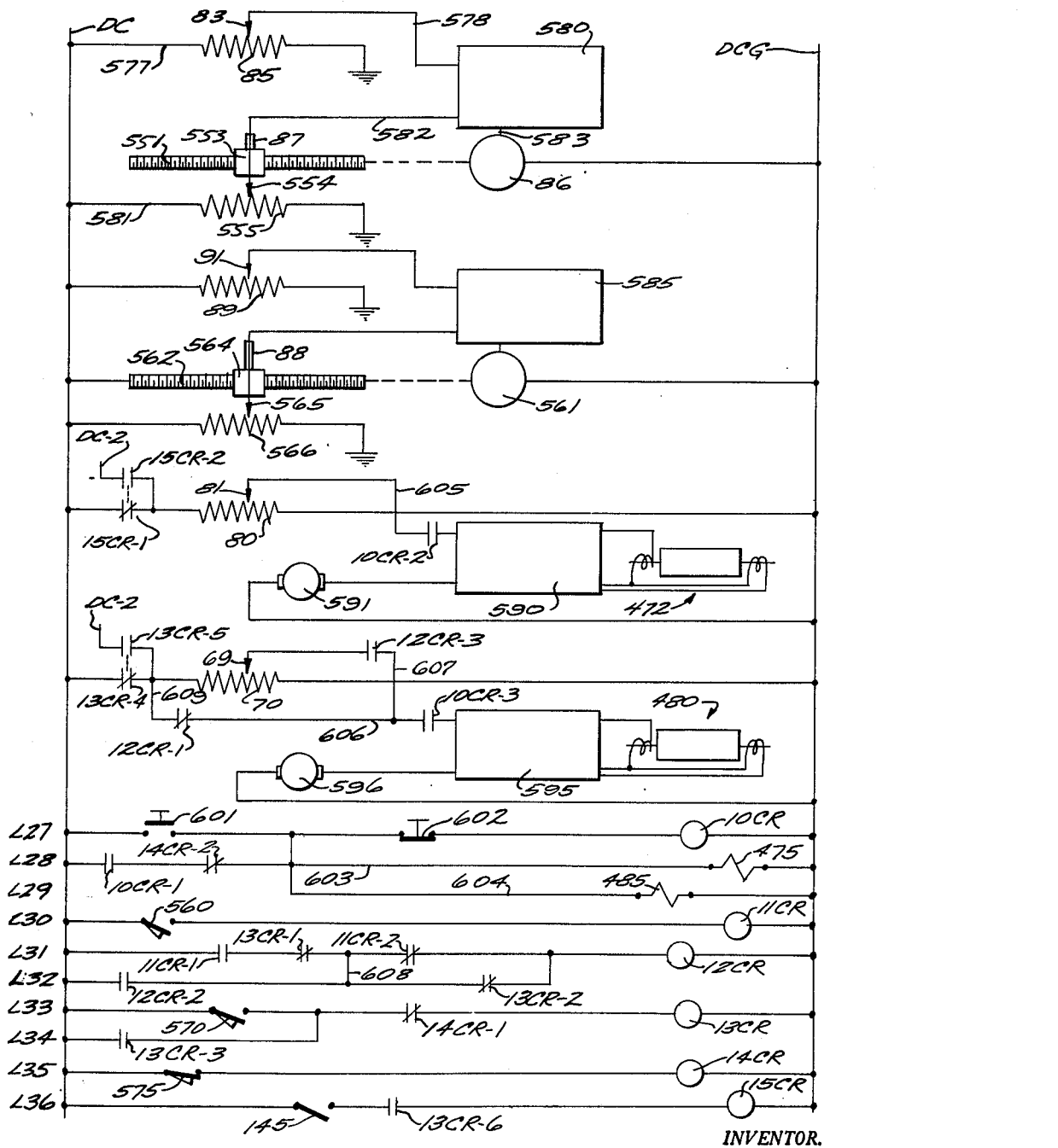

FIG. 12 is a diagrammatic view of the electrical control circuit for controlling the operation of the elements involved when the automatic setup mechanism is positioning the spindles to locations determined by the information furnished to the tape control circuit shown in FIG. 11; and, FIG. 13 is a diagrammatic view of the electrical control circuit for regulating the feed cycle of the spindle head.

Figure 1:
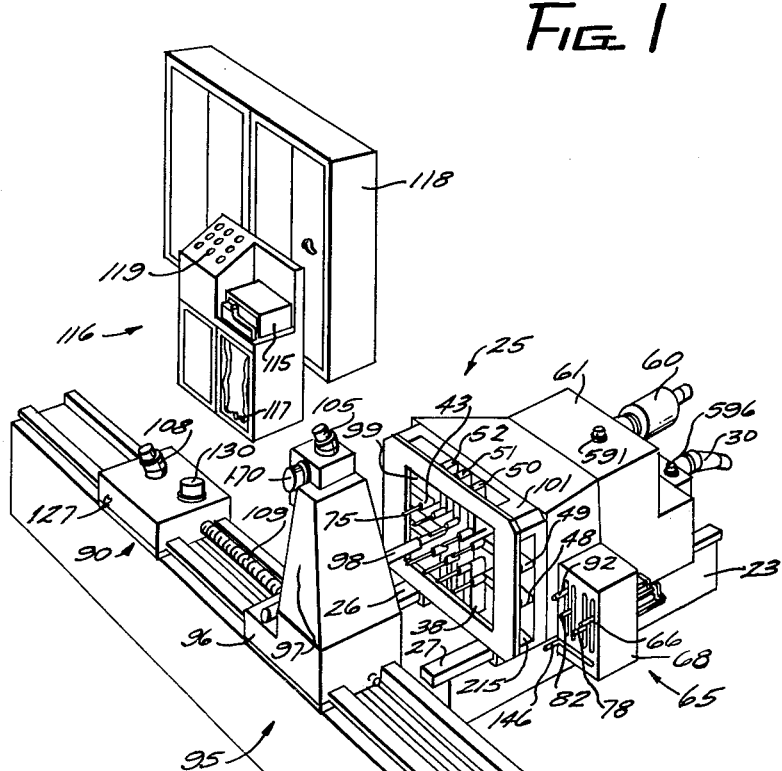
FIGURE 1 is a perspective view of a multiple spindle drilling machine incorporating the features of the present invention.

Reference is now made more particularly to the drawings and specifically to FIGURE 1 thereof which illustrates a multiple spindle drilling machine incorporating the features of the present invention. The illustrated machine comprises a bed 20 presenting horizontal ways 21 and 22. A bed extension 23 extends transversely of the bed 20 and rearwardly therefrom for slidably supporting a multiple spindle drilling head generally identified by the reference numeral 25. Horizontal ways 26 and 27 extend longitudinally along the top surface of the bed extension 23 for engagement with cooperating ways 28 and 29 (FIG. 3) provided on the underside of the spindle head 25. The horizontal movement of the spindle head 25 along the ways 26 and 27 serves as the feeding movement for feeding a plurality of tools into a workpiece (not shown) and the head 25 is driven in its path of travel by a motor 30 which is connected to actuate a screw and nut mechanism (not shown) in well known manner for effecting the feeding movement of the spindle head 25.

In the illustrated embodiment the spindle head 25 carries ten spindles 35 to 44, inclusive, which are journalled in the inner ends of a plurality of spindle holders or support arms 45 to 54, inclusive, respectively, and are arranged to carry cutting tools 75. The spindles 35 to 44 are rotated simultaneously by a motor 60 that is connected to drive a transmission 61 which, in turn, is connected to transmit the drive from the motor 60 to each of the ten spindles 35 to 44. The support arms 45 to 54, inclusive, are movably supported by the spindle head 25 for the purpose of moving their associated spindles laterally in order to adjust the relative positions of the ten spindles into the required pattern for performing different machining operations.

When a new set of tools 75 has been installed in the spindles 35 to 44, inclusive, it may be necessary to move the spindles laterally into the spacing or pattern required for drilling the holes in the workpiece. Such lateral positioning of the spindles 35 to 44 is performed automatically by an automatic setup mechanism or spindle positioner 95. The latter comprises a base 96 slidably supported on the ways 21 and 22 so that the unit may be moved along the length of the bed 20. An upstanding column 97 is formed integrally with the base 96 and extends upwardly therefrom to support a spindle grip 98 for vertical movement.

The spindle grip 98 is movable axialy relative to its supporting column 97 into encompassing engagement with the individual spindles 35 to 44, inclusive, so that the engaged spindle will move laterally with the spindle grip 98 for locating it in a desired location within a rectangular opening 99 formed by a frame 101 on the spindle head 25. The spindle grip 98 is moved vertically by a hydraulic motor 105 that is supported on the top of the column 97 and is connected to drive a screw 106 which is depicted in FIG. 6 and is in threaded engagement with a nut 107 for effecting the movement of the spindle grip 98 in well-known manner. The horizontal movement of the spindle grip 98 is obtained by moving the setup mechanism 95 along the ways 21 and 22. The drive unit 90 is provided for this purpose and includes a hydraulic motor 108 that is supported on top of the housing of the drive unit 90 and is connected to rotate a screw 109 which is in threaded engagement with a nut 110 that is secured to the underside of the base 96, as shown in FIGS. 6 and 7.

Figure 2:
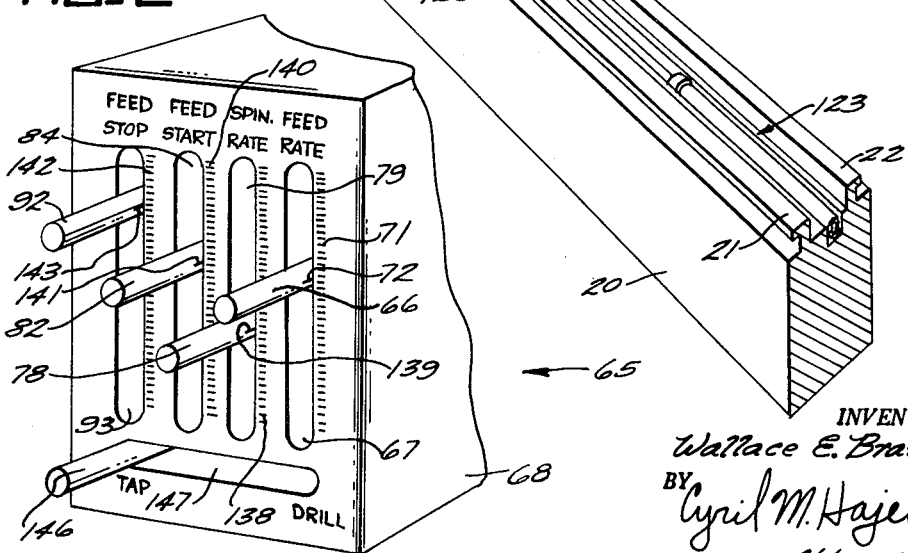
FIG. 2 is a detail view in perspective depicting the cycle control box which is shown mounted on the side of the spindle head in FIG. 1.

In order to regulate the cycle of operation of the spindle head 25, the automatic setup mechanism 95 is adapted to adjust the elements of a cycle control box which is generally identified by the reference numeral 65 and is clearly illustrated in FIG. 2. The cycle control box 65 is mounted on the right side of the spindle head 25, as viewed in FIG. 1, and is provided with a lever 66 that extends through a slot 67 into a housing 68 which encloses the electrical control elements of the cycle control box 65.

The lever 66 is connected to a slider 69 of a potentiometer 70 which is fully enclosed in the housing 68 but is depicted diagrammatically in FIG. 13. The potentiometer 70 is connected, in a manner to be later described, to regulate the rate of movement of the spindle head 25 for feeding the tools 75 into a workpiece. The lever 66 is therefore movable vertically in the slot 67 to adjust the position of the slider 69 in the potentiometer 70 for the purpose of establishing the feed rate of the spindle head 25. Suitable indicia 71 are provided along the edge of the slot 67 to cooperate with a mark 72 on the lever 66 for indicating the rate of the feeding movement which will be obtained for any setting of the potentiometer 70.

In like manner, a lever 78 is disposed to move vertically in a slot 79 formed in the housing 68 parallel and adjacent to the slot 67, the lever 78 being connected to a slider 81 of a potentiometer 80. The potentiometer 80 is fully enclosed in the housing 68 but is illustrated diagrammatically in FIG. 13 and is connected in the electrical control circuit, in a manner to be subsequently described, for regulating the speed of rotation of the spindles 35 to 44. Another lever 82 is connected to a slider 83 of a potentiometer 85 which is enclosed in the housing 68 and illustrated diagrammatically in FIG. 13. The lever 82 extends outwardly of the housing 68 through a slot 84 which is adjacent and parallel to the slots 79 and 67. Vertical movement of the lever 82 along the slot 84 serves to adjust the potentiometer 85 which is connected in the electrical control circuit to regulate the operation of a motor 86, shown in FIG. 9. The motor 86 is arranged to move a dog 87 for establishing the position in the forward movement of the spindle head 25 at which it will change its rate of movement from a rapid rate to the feed rate.

The maximum forward movement of the spindle head 25 may be set by adjusting the position of a dog 88 along the bed extension 23 by adjusting a potentiometer 89 which is enclosed in the housing 68 and is illustrated diagrammatically in FIG. 13. To this end, a slider 91 of the potentiometer 89 is connected to a lever 92 which extends outwardly of the housing 68 through a slot 93 so that the lever 92 may be moved vertically along the slot 93 for adjusting the potentiometer 89, the slot 93 being parallel and adjacent to the slots 84, 79 and 67.

Suitable indicia 138 are provided on the housing 68 along the edge of the slot 79 to cooperate with a mark 139 on the lever 78 to indicate the rate of rotation of the spindles 35 to 44, inclusive, for any particular setting of the potentiometer 80.

In like manner, indicia 140 are provided along the edge of the slot 84 to coperate with a mark 141 on the lever 82 for indicating the location of the dog 87 for any specific setting of the potentiometer 85 which is associated with the lever 82. Similarly, indicia 142 are formed on the housing 68 adjacent to the slot 93 for cooperating with a mark 143 that is provided on the lever 92 to indicate the location of the dog 88 for any position of the lever 92.

The housing 68 of the cycle control box 65 also encloses a switch 145 which is illustrated diagrammatically in the electrical control circuit in FIG. 13. A lever 146 is connected to the switch 145 within the housing 68 and extends outwardly therefrom through an elongated slot 147 so that it may be moved horizontally to the left to close the switch 145 to establish the feed cycle for performing a tapping operation. On the other hand, the lever 146 may be shifted to the right side of the slot 147, as viewed in FIG. 2, to open the switch 145 to set the feed cycle for performing operations other than tapping operations.

In order to automatically adjust the electrical elements contained in the cycle control box 65, the levers 66, 78, 82, 92 and 146 are engaged by the spindle grip 98 successively and the spindle grip is then moved in response to information funished to the control circuit to position the levers for adjusting their associated electrical control elements to establish the desired cycle of operation of the spindle head 25. Thus, in order to establish the feed rate for the spindle head 25, the spindle grip 98 will be moved laterally into alignment with the lever 66. Upon achieving such alignment, the spindle grip 98 will be advanced axially to encompass the lever 66 so that it will move laterally with the lateral movement of the spindle grip 98. The control circuit will then function to operate the motor 105 for moving the spindle grip 98 in a vertical path and thereby obtain the desired positioning of the lever 66 to adjust its associated potentiometer 70 for establishing a definite feed rate for the subsequent machining operation. In like manner, the other potentiometers in the cycle control box 65 may be adjusted by the operation of the automatic setup mechanism 95. In addition, the switch 145 may be operated by the setup mechanism 95 to condition the electrical control circuit for establishing either a tapping operation or a different machining operation. Thus, the lever 146 is illustrated in FIG. 2 in position to close the switch 145 for performing a tapping operation. If the succeeding machining operation is to be a drilling operation, the spindle grip 98 will be positioned into alignment with the lever 146 and will then be moved axially to encompass the bar 146. The control circuit will then function to regulate the operation of the motor 108 for movement of the spindle grip 98 in a rightward direction, as viewed in FIG. 2, to move the lever 146 to the rightward end of the slot 147 for opening the switch 145 and thereby condition the electrical control circuit to regulate the feed cycle for performing a drilling operation. Any of the components of the cycle control box may also be adjusted manually for setting a feed cycle.

In order to obtain full advantage of the features of the present invention, suitable control mechanism is provided for regulating the operation of the motor 105 and 108 to obtain the desired positioning of the spindles 35 to 44. A variety of control systems are available for achieving such regulation of motors to position a movable element, such as the spindle grip 98. In this case, of course, the positioning of the spindle grip 98 serves to position the spindles in the spindle head 25 for obtaining a definite drilling pattern to accommodate the workpiece that is to be machined and adjusts the electrical elements contained in the cycle control box 65 for establishing the cycle of operation of the spindle head 25. A control system operating in response to information recorded on a punched tape will function very satisfactorily for controlling the hydraulic motors 105 and 108 and is therefore illustrated herein as an exemplary embodiment.

As shown in FIGURE 1, a tape reader 115 is supported by a console generally identified by the reference numeral 116. A tape 117 is inserted in the tape reader 115 which operates to read the information contained on the tape 117 and transmits it to an electrical control circuit which is housed in a cabinet 118. The electrical control circuit in the cabinet 118, in turn, operates to regulate the operation of the machine in response to the information transmitted from the tape 117 as well as from a plurality of manually operated switches on a panel 119 carried by the console 116 for manipulation by the operator to manually control the movements of various elements of the machine.

The automatic setup mechanism 95 is connected to the drive unit 90 by the screw 109 and the two assemblies can therefore be moved along the ways 21 and 22 as a unit. When the positioning of the spindles 35 to 44 has been completed, the drive unit 90 and the setup mechanism 95 are moved to the right, as viewed in FIGURE 1, along the ways 21 and 22 to clear the machining station, in front of the spindle head 25, for the introduction of workpieces. The workpieces may be mounted on pallets (not shown) which are slidably supported by the ways 21 and 22 for movement from the left side of the machine into the machining station to position the workpieces for operation upon by the tools 75 which are carried by the spindles. In order to move the two assemblies 90 and 95 between their operation positions, as shown in FIG. 1, and a parking station (not shown) located at the extreme rightward end of the bed 20, an elongated piston and cylinder mechanism 123 is mounted on the bed 20 between and beneath the ways 21 and 22. The piston and cylinder mechanism 123 is provided with a connecting rod 125 that is connected to the drive unit 90, as shown in FIG. 7, for shifting the assemblies 90 and 95 between their operating positions, as shown in FIG. 1, and the parking station. After the piston and cylinder mechanism 123 has moved the assemblies 90 and 95 to their operating positions, a shot bolt 127, which is slidably carried by the housing of the drive unit 90, may be moved inwardly to engage a cooperating hole (not shown) formed in the bed 20 to accurately locate the drive unit 90 in its operating position. Such accurate location of the drive unit 90 serves as a reference for the movements of the automatic setup mechanism 95.

The details of the automatic setup mechanism 95 are illustrated in FIGS. 6, 7 and 8 wherein the nut 110 is illustrated as being of split construction comprising two nut elements 128 and 129 which are adjustable axially relative to each other in a well known manner for eliminating the backlash between the threads of the screw 109 and the nut 110. The nut 110 is secured to the base 96 and has threaded engagement with the screw 109 which is journalled in the drive unit 90 where it is connected to be rotated by the motor 108 in response to information received from the tape 117. A feedback element 130 is mounted on top of the housing of the drive unit 90 and is mechanically connected to be actuated by the rotation of the screw 109. The feedback element 130 is electrically connected in the electrical control circuit for the purpose of producing a feedback signal to indicate the position of the setup mechanism 95, or, more specifically, the spindle grip 98 in its lateral horizontal path of travel.

A pair of hydraulic cylinders 131 are formed in the drive unit 90 to enclose cooperating pistons 132 for actuating clamping elements 133 to rigidly secure the drive unit 90 to the bed 20 while it is operating to move the setup mechanism 95. With this arrangement, after the drive unit 90 is accurately located by operation of the shot bolt 127, hydraulic pressure is directed to the cylinders 131 beneath the pistons 132 to force the pistons 132 upwardly for actuating the clamping elements 133 into tight engagement with the underside of the ways 21 and 22 to clamp the drive unit 90 in position.

Figure 10:
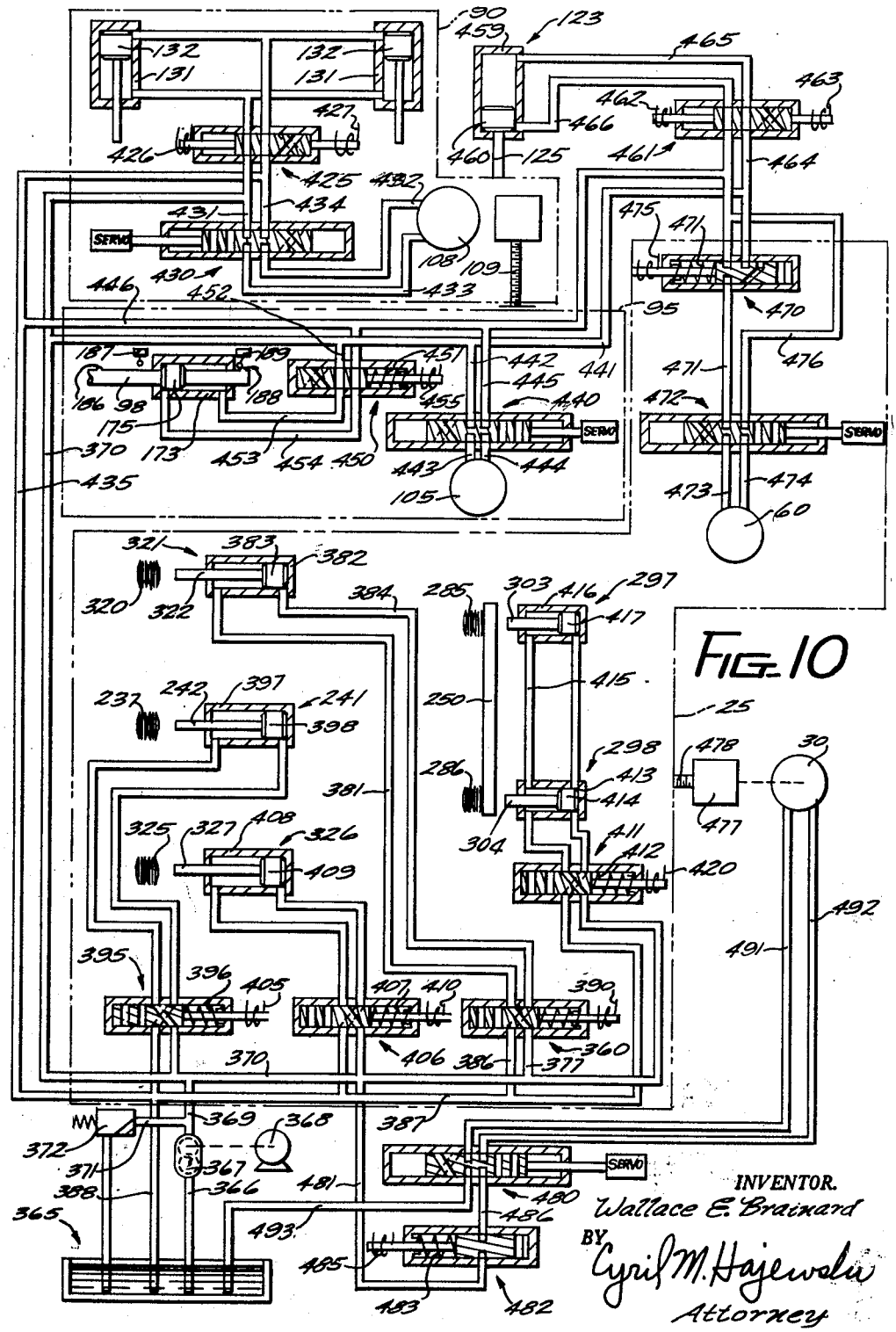
FIG. 10 is a schematic view of the hydraulic circuit for the machine.

As clearly shown in FIG. 7, a bracket 152 depends from the drive unit 90 and is provided with an opening to receive a threaded reduced diameter end of the connecting rod 125 of the piston 460, shown in FIG. 10. The theaded end of the connecting rod 125 extends through the bracket 152 and is engaged by a nut 153 to connect the end to the bracket. Another bracket 154 depends from the base 96 of the setup mechanism 95 to slidably support the central portion of the connecting rod 125. With this arrangement, leftward movement of the piston rod 125 of the piston and cylinder mechanism 123 will serve to simultaneously move the drive unit 90 and the setup mechanism 95 to their operating station in front of the spindle head 25. After the set up mechanism 96 has functioned to complete the required setting of the machine, the piston and cylinder mechanism 123 will be actuated by hydraulic pressure for effecting simultaneous movement of the drive unit 90 and the setup mechanism 95 to a parking station at the rightward end of the bed 20 where they will not interfere with the introduction of workpieces to the machining station in front of the spindle head 25.

A bearing block 160 is mounted at the top of the column 97 for rotatably supporting the upper end of the screw 106. The lower end of the screw is journalled in the base 96 by antifriction bearings 161 as illustrated in FIG. 6. The screw 106 is in threaded engagement with the nut 107 which is secured to a slide 162 by cap screws 163. The slide 162 is slidably supported by the column 97, as best shown in FIG. 8, being retained against the interior walls of the column 97 by elongated upstanding plates 164 and 165 which engage flanges 158 and 159 formed on the slide 162 and are attached to the column 97 by screws 166 and 167, respectively. With this arrangement, rotation of the screw 106 by the motor 105 will cause a movement of the slide 162 in its vertical path of travel. The drive for rotating the screw 106 is also connected to actuate a feedback assembly 170 to produce a feedback signal for indicating in the tape control circuit the instant vertical position of the spindle grip 98 which is carried by the slide 162.

The spindle grip 98 is slidably supported for axial movement by a pair of bearings 171 and 172 which are carried in the opposite ends of a cylinder 173, as shown in FIG. 6. The central portion of the spindle grip 98 is enlarged to form a piston 175 which is disposed in a cylindrical opening 176 formed in the cylinder 173. The left end of the cylindrical opening 176, as viewed in FIG. 6, is closed by the bearing 172 with an O-ring 177 being provided for completing a hydraulic seal, the O-ring and bearing 172 being retained within the cylinder 173 by a plate 178. The opposite end of the cylindrical opening 176 is closed by the bearing 171 with an O-ring 179 being provided to seal the end and a plate 180 being secured to the end of the cylinder 173 to retain the bearing 171 and the O-ring 179 in position within the cylinder 173.

A pair of ports 184 and 185 are provided in the cylinder 173 for carrying hydraulic fluid to and from the cylindrical opening 176. Thus, hydraulic pressure directed through the port 185 will act upon the piston 175 to move the spindle grip 98 rightwardly to its advanced position for engaging the spindles of the spindle head 25 or the levers of the cycle control box 65. The advancing movement of the spindle grip 98 is limited by the engagement of the piston 175 with the bearing 171. The retracting movement of the spindle grip 98 is effected by directing pressure into the port 184 on the right side of the piston 175 for forcing the piston leftwardly, as viewed in FIG. 6, until it engages the bearing 172.

A dog 186 is mounted on the left end of the spindle grip 98, as viewed in FIG. 6, to cooperate with a limit switch 187 that is mounted on the plate 178 at the leftward end of the cylinder 173. In like manner, a dog 188 is secured to the rightward or forward end of the spindle grip 98 for cooperation with a limit switch 189 that is secured to the plate 180 on the rightward end of the cylinder 173. Upon the completion of the advancing movement, the dog 186 actuates the limit switch 187 to indicate in the electrical control circuit that the spindle grip 98 has been fully advanced. Similarly, upon the completion of a retracting movement, the dog 188 actuates the limit switch 189 to indicate in the electrical control circuit that the spindle grip 98 has been fully retracted.

Figure 3:
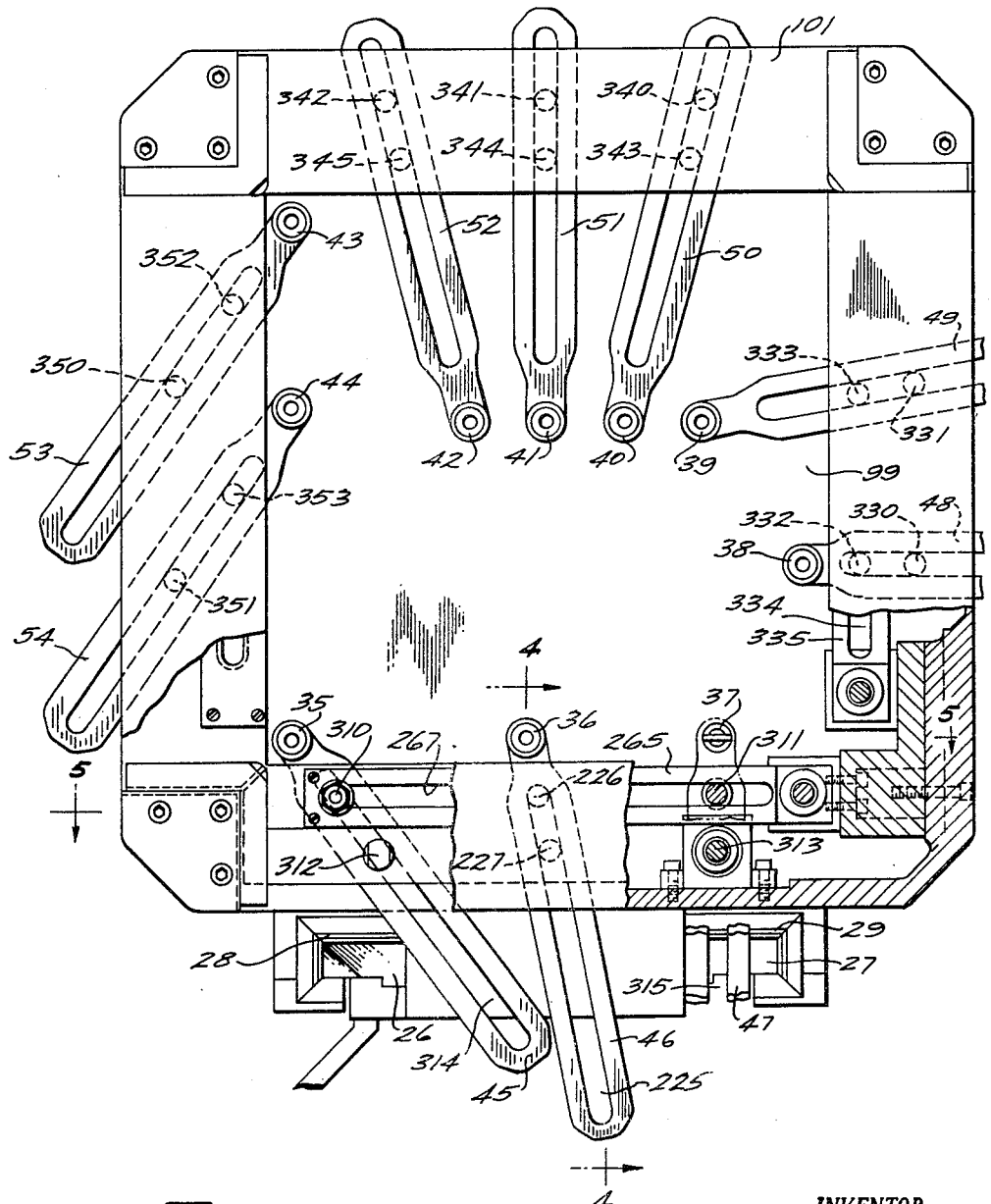
FIG. 3 is a detail view in front elevation showing the mounting of the several spindle support arms in the spindle head.

As previously mentioned, the spindles 35 to 44 are rotatably supported by the support arms 45 to 54, respectively, with the support arms being movable for effecting lateral movement of the spindles for varying their location within the rectangular opening 99. Inasmuch as the mounting of each of the several spindles is identical, only one of these spindles and its associated support arm will be described in detail. As best shown in FIGS. 3 and 4, the tool spindle 36 is journalled at one end of the spindle suporting arm 46. The spindle 36 is provided with a rearwardly extending reduced diameter portion 195 which is journalled in sleeve bearings 196 and 197 that are carried in aligned openings formed in spaced apart portions 198 and 199 of the inner end of the support arm 46. A shoulder 201 formed by the reduced diameter portion 195 of the spindle 36 engages one race of a thrust bearing 202 which has its opposite race in engagement with the end face of the portion 199 of the support arm 46. The rearward end of the spindle 36 is threaded for receiving a pair of lock nuts 203 which lock the spindle 36 in position on the inner end of the support arm 46.

A rearward extremity 204 of the spindle 36 is of reduced diameter and is pinned to a tubular connector 205 that is a part of a universal joint 206. The opposite end of the universal joint 206 is secured to a sleeve 207 which has an interior spline that is in engagement with a splined shaft 208 so that the sleeve 207 may telescope relative to the shaft 208 without interrupting the connection between them. The inner end of the splined shaft 208 is connected to another universal joint 210 that has its opposite end connected to a shaft 211 which is driven by the transmission 61. The latter, in turn, is driven by a motor shaft 212 which is rotated by the spindle drive motor 60. The transmission 61 is of a well known type which is arranged to simultaneously drive all of the spindles 35 to 44, inclusive, at the same rate of rotation. As the tool spindle 36 is moved laterally to different positions of adjustment within the rectangular opening 99, the telescoping splined sleeve 207 is slidably extensible in well known manner to maintain the rotative driving connection between the transmission output shaft 211 and the tool spindle 36.

The spindle support arm 46, as well as the other spindle support arms, are located for sliding movement in an opening 215 which is formed by the structure of the spindle carrying frame 101, the opening 215 being defined by vertically disposed surfaces 216 and 217 formed in the frame 101. The vertical surfaces 216 and 217 are in sliding engagement with surfaces 218 and 219 of the support arm 46 so that the surfaces 218 and 219 are in frictional engagement with the surfaces 216 and 217, respectively, but the arm 46 is movable relative to the surfaces 216 and 217 of the frame 101 for positioning the spindle 36 within the opening 99.

The vertical surface 216 is in perpendicular relationship to the horizontal ways 26 and 27 which guide the spindle head 25 for horizontal movement. The surface 218 of the spindle support arm 46 is likewise in accurate perpendicular relationship to the axis of rotation of the tool spindle 36. Therefore, when the spindle 36 is clamped to the frame 101 for performing a machining operation, the surface 218 of the support arm 46 is moved into tight clamping engagement with the surface 216 of the frame 101. With this arrangement, the tool spindle 36 is accurately maintained in parallel with the horizontal path of travel of the spindle head 25 during a machining operation.

A centrally located longitudinal slot 225 is formed in the spindle support arm 46 for receiving two clamping members or elements 226 and 227 which are carried by the frame 101. The clamp element 227 is provided with a flanged end 228 that is disposed within a circular bore 229 formed in the frame 101 so that the flange 228 may be moved axially therein. The opposite end of the clamp element 227 extends through a bore 230 formed in the frame 101 on the opposite side of the spindle support arm 46. The clamp element 227 is therefore constrained from lateral movement but is guided for axial movement by the bores 229 and 230. The bore 229 is formed in a web 231 while the bore 230 is formed in a web 232, the two webs 231 and 232 being integrally formed as a part of the frame 101 but separated from each other by the opening 215 in which the spindle support arms 45 to 54 are located.

The clamping element 227 extends through the slot 225 formed in the spindle support arm 46 and functions as a fixed pivot axis during the movement of the support arm 46 for positioning the spindle 36. The clamping element 227 also serves to clamp the support arm 46 in its established position by applying pressure to the support arm to force its surface 218 into tight clamping engagement with the surface 216 of the web 232. The clamping pressure is applied to the spindle support arm 46 by a Belleville spring 237 which is mounted about the left end of the clamping member 227 between a pair of thrust washers 238 and 239 and is retained on the left end of the clamping member 227 by a cap screw 240 which is threaded into the end of the clamp element 227.

The Belleville spring 237 therefore has its right end bearing against the stationary web 232 through the thrust washer 238 and continuously acts against the thrust washer 239 to urge the clamp element 227 to the left, as viewed in FIG. 4. As a result, the flange 228 of the clamping member 227 forces the arm 46 to the left to produce a tight frictional engagement between the surface 218 of the spindle support arm 46 and the surface 216 of the fixed web 232 for locking the support arm 46 in the established position.

The clamp element 227 is actuated in the opposite direction against the force of the Belleville spring 237 to release the spindle support arm 46 for movement in the opening 215 by the operation of a piston and cylinder mechanism 241. The piston and cylinder mechanism is mounted in the spindle head 25 directly behind the frame 101 with its piston rod 242 in alignment with the clamping member 227. Therefore, when the piston and cylinder mechanism 241 is actuated by hydraulic pressure, the connecting rod 242 will move into engagement with the cap screw 240 and compress the spring 237 while shifting the clamp member 227 axially for relieving the clamping pressure on the spindle support arm 46. When both clamp elements 226 and 227 are released, the spindle support arm 46 is movable within the opening 215 but in order to avoid inadvertent displacement of the spindle arm 46, the surfaces 218 and 219 of the support arm 46 are continuously in frictional engagement with the surfaces 216 and 217 of the frame 101.

The clamping member 226 also extends through the slot 225 formed in the spindle support arm 46 to serve as a pivot for the support arm. However, while the clamping member 227 is fixed in the frame 101, the clamping member 226 is a movable pivot axis to enable the spindle 36 to be freely positioned to the limits of its movement within the rectangular opening 99. A flange 249 is formed on the left end of the clamping member 226, as viewed in FIG. 4, for the purpose of engaging a face of a bridge clamp member 250. The bridge clamp member 250 is provided with a slot 251 for receiving the clamp member 226 and permitting it to be moved laterally while retaining the flange 249 in engagement with the face of the clamp member 250. In order to provide for the lateral movement of the clamping member 226, a roller bearing 252 encircles the clamp member 226 and is located in a slot 253 formed in the web 232. The outer race of the bearing 252 engages the walls of the slot 253 so that the latter acts to guide the clamping member 226 in a definite path of lateral travel.

The bearing 252 is retained in position on the clamping member 226 by a spacer sleeve 254 which encompasses the clamping member 226 on the left side of the bearing 252, as viewed in FIG. 4, while another spacer sleeve 255 encompasses the central portion of the clamping member 226 to the right of the bearing 252. The spacer sleeve 255 encompasses the clamping member 226 along that portion of its length which is disposed in the slot 225 of the support arm 46 so that the walls of the slot 225 are engaged by the spacer sleeve 255 rather than by the clamping member 226 itself. The clamping member 226 is of a reduced diameter but the spacer sleeves 254 and 255 have a diameter which corresponds to the diameter of the clamping member 227.

Another roller bearing 260 encompasses the rightward end of the clamping member 226 and abuts the right end of the spacer sleeve 255. The outer race of the bearing 260 is disposed within a slot 261 formed in a floating bridge clamp member 262 which is shown in FIGS. 4 and 5. A clamping plate 265 is secured to the outer side face of the floating clamp member 262 by cap screws 266. The clamping plate 265 is provided with an elongated slot 267 for receiving a spacer sleeve 268 which encircles the clamping member 226 and bears against the inner race of the antifriction bearing 260. The outer extremity of the clamping member 226 is threaded for receiving a nut 269 which locks the spacer sleeve 254, the bearing 252, the spacer sleeve 255, the bearing 260 and the spacer sleeve 268 on the clamping member 226, as clearly shown in FIG. 5. The spacer sleeve 268 includes a flange 270 which is engaged by the nut 269 and is of a greater diameter than the width of the slot 267 so that the annular surface of the flange 270 slides along the exterior surface of the plate 265 while the body portion of the spacer sleeve 268 is disposed within the slot 267.

The floating clamp member 262 with its associated clamping plate 265 is supported in the frame 101 by a pair of brackets 271 and 272 which are secured to the frame 101 by cap screws 273 and 274, respectively. In order to permit the lateral movement of the floating bridge clamp member 262, it is coupled to the bracket 271 by means of a pin 275 and to the bracket 272 by a pin 276. The pin 275 extends into a hole 277 formed in the bracket 271 and a hole 278 formed in the left end of the floating bridge clamp member 262 as viewed in FIG. 5. In like manner, the pin 276 extends into a hole 279 formed in the bracket 272 and a hole 280 formed in the right end of the bridge clamping member 262. With this arrangement, the floating clamp member 262 is supported in position by the brackets 271 and 272 and is guided for lateral movement toward and away from the spindle support arm 46 by the pins 275 and 276 which are relatively loosely fitted in the holes 278 and 280 which are formed in the member 262.

As previously described, the clamping member 227 is actuated by the Belleville spring 237 to force the face 218 of the spindle support arm 46 into tight clamping engagement with the surface 216 of the web 232. The clamp member 226 also functions to forrce the face 218 of the support arm 46 into tight clamping engagement with the surface 216 by applying pressure to the spindle support arm 46. Such clamping action is obtained by a pair of Belleville springs 285 and 286 which act against a pair of flanged ends 287 and 288, respectively, that are formed at opopsite ends of the bridge clamp member 250. The Belleville spring 285 is disposed about a pin 290 which extends into a hole 289 formed in the web 232. The pin 290 serves to retain the Belleville spring 285 in position with one end bearing against the fixed web 232 and its opposite end in engagement with the flanged end 287 of the bridge clamp member 250 with the spring bieng arranged to continuously urge the flanged end 287 and its associated clamp member 250 away from the fixed web 232.

In like manner, the Belleville spring 286 at the opposite end of the bridge clamp member 250 encircles a pin 295 that extends outwardly of a hole 296 formed in the web 232. The pin 296 serves to retain the Belleville spring 286 in position between the interior face of the web 232 and the flanged end 288 of the bridge clamp member 250 with the Belleville spring 286 being arranged to likewise continuously urge the flanged end 288 of the bridge clamp member 250 away from the fixed web 232. As the clamp member 250 is urged away from the fixed web 232 by the Belleville springs 285 and 286, it engages the flanged end 249 of the clamping member 226 to apply an axial pressure on the clamp member 226 for effecting the clamping action. Such axial pressure on the clamp member 226 acts through the flange 270 of the spacer sleeve 268 to shift the floating bridge member 262 laterally against the face 219 of the spindle support arm 46 to force its opposite face 218 into tight clamping engagement with the surface 216 on the web 232.

With this arrangement, the Belleville springs 285 and 286 act on the flanged ends 287 and 288 to continuously urge the bridge clamping member 250 in a direction to apply a clamping pressure to the spindle support arm 46 as well as to the other support arms that are associated with it. A pair of piston and cylinder mechanisms 297 and 298 are provided for relieving the pressure applied by the Belleville springs 285 and 286 to release the associated spindle support arms. The flanged ends 287 and 288 of the bridge clamping member 215 are provided with adjustable cap screws 301 and 302, respectively. The head of the cap screw 301 serves as an abutment which is engaged by a piston rod 303 of a piston and cylinder mechanism 297 for releasing the clamping pressure. In like manner, the cap screw 302 acts as an abutment for engagement by a piston rod 304 of the piston and cylinder mechanism 298 and when it is desired to release the spindle support arms associated with the bridge clamp member 250, the piston and cylinder mechanisms 297 and 298 are simultaneously actuated so that their piston rods 303 and 304 engage the cap screws 301 and 302, respectively, and force the bridge clamp member against the pressure of the Belleville springs 285 and 286 to relieve the clamping pressure and thereby release the associated spindle support arms. The piston and cylinder mechanisms 297 and 298 are mounted on suitable brackets 305 and 306 wihch are carried by the frame 101 of the spindle head 25.

It is apparent from the above description that the spindle support arm 46 may be clamped at two points by the operation of the clamping elements 227 and 226. The clamping element 227 is actuated by the Belleville spring 237 which functions to apply the clamping pressure for clamping only the spindle support arm 46. On the other hand, the clamping element 226 is actuated by the common bridge clamp member 250 through the force applied by the two Belleville springs 285 and 286. While the Belleville spring 237 applies the clamping pressure to the spindle support arm 46 individually, the Belleville springs 285 and 286 act through the bridge clamp member 250 to apply the clamping pressure to the three spindle support arms 45, 46 and 47 simultaneously, as shown in FIGS. 3 and 5. When the piston and cylinder mechanism 241 is actuated to release the individual clamping pressure on the spindle support arm 46 and the piston and cylinder mechanisms 297 and 298 are likewise actuated to release the clamping pressure applied by the common bridge clamp member 250, the spindle support arm 46 may be moved in the opening 215 for effecting lateral positioning of the spindle 36. The spindle support arm 46 may be moved inwardly to the extent determined by the length of the slot 225 which is formed in the spindle support arm 46. During such movement, the clamping element 227 serves as a stationary pivot axis for the spindle support arm 46 while the clamping element 226 serves as a movable pivot axis since the latter is movable laterally within the slot 253 formed in the web 232 and the slot 261 formed in the floating bridge clamp member 262. Thus, if the spindle 36 is moved inwardly of the rectangular opening 99 until the end of the slot 225 engages the stationary clamping element 227, the spindle 36 may be moved in an arcuate path within the rectangular opening 99 and this arcuate path will define the area within the rectangular opening 99 in which the spindle 36 may be positioned. The axis of the clamping element 227 serves as the axis for the arcuate movement of the spindle 36 and during such arcuate movement of the spindle, the clamping element 226 will be moved within the slots 253 and 261.

The ten spindle support arms 45 to 54 are identical in construction to the spindle support arm 46 which was described above. Each of these spindle support arms has an individually actuatable clamping element identical to the clamping element 227 of the spindle support arm 46 and also has a movable clamping element identical to the clamping element 226. The stationary clamping elements are all individually actuatable while the movable clamping elements are actuatable in groups by a common bridge clamping member identical to the bridge clamp member 250 described above. Thus, the three spindle support arms 45, 46 and 47 which are located along the bottom of the frame 101 are each provided with movable clamping elements 310, 226 and 311, respectively. In like manner, these support arms 45, 46 and 47 are also each provided with stationary clamping elements 312, 227 and 313. The two clamping elements 310 and 312 of the spindle support arm 45 are both located in the longitudinal slot 314 which is formed in the support arm. As previously described, the spindle support arm 46 is provided with a longitudinal slot 225 for receiving the clamping elements 226 and 227. In like manner, the spindle support arm 47 is provided with a slot 315 for receiving its two clamping elements 311 and 313. The stationary clamping element 312 for the spindle support arm 45 is continuously urged to effect a clamping pressure upon the spindle support arm by a Belleville spring 320 as clearly illustrated in FIG. 5. The clamping pressure applied by the spring 320 is relieved by actuating a piston and cylinder mechanism 321 to force its piston rod 322 in a direction to compress the spring 320 in the same manner as described for the clamping element 227 of the spindle support arm 46. In the same manner, a Belleville spring 325 is disposed to actuate the stationary clamping element 313 of the spindle support arm 47 and this clamping pressure may be relieved by actuating a piston and cylinder mechanism 326. The movable clamping elements 310 and 311 of the spindles 45 and 47, respectively, are actuated by the common spindle bridge clamp member 250 in the same manner as described for the movable clamping element 226 of the spindle support arm 46. Thus, the pressure applied by the two Belleville springs 285 and 286 on the common bridge clamp member 250 serves to actuate all three of the movable clamp elements 310, 226 and 311. By the same token, the actuation of the piston and cylinder mechanisms 297 and 298 releases all three of these movable clamping elements.

In the same manner, the spindle support arms 48 and 49 which carry the spindles 38 and 39, respectively, are provided with stationary clamping elements 330 and 331 which are individually actuated in the same manner as previously described for the stationary clamp element 227 of the spindle support arm 46. In addition, the spindles 38 and 39 are provided with movable clamp elements 332 and 333 that are both actuated by a common bridge clamp member 336, which is shown in FIG. 4 and is similar to the common bridge clamp member 250. The movable clamp elements 332 and 333 are movable in a slot 334 formed in a clamping plate 335 which is similar to the clamping plate 265 that cooperates with the spindle support arms 45, 46 and 47. In like manner, the spindle support arms 50, 51 and 52 are provided with individually operable stationary clamping elements 340, 341 and 342 which are identical in construction to the stationary clamping element 227 for the spindle support arm 46. In addition, these spindle support arms also include movable clamping elements 343, 344 and 345 which are actuated by a single common bridge clamp member (not shown) which is identical to the bridge clamp member 250.

The identical arrangement is provided for the spindle support arms 53 and 54 which support the spindles 43 and 44. Thus, the spindle support arm 53 includes a stationary clamp element 350 which functions as a stationary pivot axis for the spindle support arm 53 and also is provided with a movable clamping element 352. The spindle support arm 54 likewise includes a stationary clamping element 351 and a movable clamping element 353. The two stationary clamping elements 350 and 351 are individually actuated by Belleville springs in the same manner as the stationary clamping element 227 is actuated by the Belleville spring 237. On the other hand, the two movable clamping elements 352 and 353 are actuated by a single common bridge clamp member (not shown) similar in construction to the common bridge clamp member 250. It is therefore apparent that each of the ten spindle support arms 45 to 54, inclusive, are provided with two clamping elements, one of which is a stationary clamping element and serves as a stationary pivot axis and the other is a movable clamping element which also serves as a movable pivot axis. The stationary clamping elements are all individually actuated by Belleville springs and released by independent piston and cylinder mechanisms. On the other hand, the movable clamping elements are divided into groups of two and three, with each group being located along one side of the rectangular frame 101 and each group of movable clamping elements is actuated by a common bridge clamping member.

The hydraulic circuit for directing the fluid pressure to the cylinders for actuating the clamping elements associated with the spindle support arms 45, 46 and 47 is illustrated diagrammatically in FIG. 10. As previously described, the piston and cylinder mechanism 321 operates to relieve the clamping pressure applied to the spindle support arm 45 by the Belleville spring 320. The piston and cylinder mechanism 241 may be actuated to relieve the clamping pressure applied to the spindle support arm 46 by the operation of the Belleville spring 237. In like manner, the piston and cylinder mechanism 326 may be actuated to relieve the clamping pressure applied to the spindle support arm 47 by the Belleville spring 325. The flow of hydraulic pressure to the piston and cylinder mechanism 321 is controlled by a solenoid valve 360. With the valve 360 in its normal position, hydraulic fluid is pumped from a reservoir 365 through an intake conduit 366 to a pump 367 which is driven by a motor 368. The pump 367 discharges the fluid into a conduit 369 which is connected to a pressure line 370. A branch line 371 is connected at one end to the discharge conduit 369 and at the opposite end to a relief valve 372 which operates in well known manner to maintain a predetermined pressure in the system.

The hydraulic pressure in the line 370 flows into a conduit 377 to the solenoid valve 360 and thence into a conduit 381 to a cylinder 382 of the piston and cylinder mechanism 321. The hydraulic pressure enters the cylinder 382 on the left side of a piston 383, as viewed in FIG. 10, to force the piston 383 in a rightward direction away from the Belleville spring 320 so as not to interfere with the clamping pressure applied by the spring. The exhaust fluid from the cylinder 382 is discharged into a conduit 384 from which it flows to the valve 360 and through a conduit 386 which is connected to a return line 387 that carries the pressure to a conduit 388 that is connected to a reservoir 365.

In order to reverse the flow of hydraulic pressure to the piston and cylinder mechanism 321, a solenoid 390 associated with the valve 360 is energized to actuate the solenoid valve 360. Actuation of the valve by the solenoid 390 serves to direct the hydraulic pressure from the line 377 to the conduit 384 into the cylinder 382 on the right side of the piston 383 to move it in the leftward direction to cause its piston rod 322 to engage the Belleville spring 320 and compress it for releasing the stationary clamping element 312 associated with the spindle support arm 45.

In like manner, a solenoid operated valve 395 is normally conditioned by a spring 396 to direct the hydraulic pressure from the pressure line 370 to a cylinder 397 of the piston and cylinder mechanism 241, on the left side of a piston 398 for releasing the Belleville spring 237 and permit the latter to apply a clamping pressure to the piston support arm 46. The flow of hydraulic pressure to the piston and cylinder mechanism 241 may be reversed by energizing a solenoid 405 which will overcome the pressure of the spring 396 to actuate the valve 395 and direct hydraulic pressure to the cylinder 397 on the right side of the piston 398. Such pressure will force the piston 398 in a leftward direction, as viewed in FIG. 10, to compress the Belleville spring 237 and thereby release the clamping element 227 for relieving the clamping pressure on the spindle support arm 46.

The piston and cylinder mechanism 326 for releasing the stationary clamping element 313 of the spindle 37 is controlled by a solenoid valve 406 which is normally conditioned by a spring 407 to direct hydraulic pressure to a cylinder 408 on the left side of a piston 409 of the piston and cylinder mechanism 326. With the piston 409 thus forced to the right end of the cylinder 408, the Belleville spring 325 is released so that it may function to actuate the stationary clamping element 313 for applying the clamping pressure to the spindle support arm 47. This clamping pressure may be released by energizing a solenoid 410 which is associated with the solenoid valve 406 to actuate the valve in opposition to the spring 407 for reversing the flow of hydraulic pressure to the cylinder 408. Such reversal of the flow of hydraulic pressure to the cylinder 408 operates to shift the piston 409 to the left end of the cylinder so that its piston rod 327 will engage the Belleville spring 325 and compress it for releasing the stationary clamping element 313 and thereby relieve the clamping pressure on the spindle support arm 47. It is therefore apparent that by individually energizing any one of the solenoids 390, 405 or 410, the stationary clamping elements 312, 227 and 313, respectively, may be released to permit lateral movement of the associated spindle support arms for positioning the spindles 35, 36 and 37.

As previously mentioned, each of these spindle support arms 45, 46 and 47 may also be clamped in position by the operation of a common bridge clamping member 250 which transmits clamping pressure applied by a pair of Belleville springs 285 and 286. However, the clamping pressure applied to the common bridge clamp member 250 by the Belleville springs 285 and 286 may be relieved by the operation of the pair of piston and cylinder mechanisms 297 and 298. Both of these piston and cylinder mechanisms are under the control of a solenoid valve 411 which is normally actuated by a spring 412 to direct hydraulic pressure to a cylinder 413 of the piston and cylinder mechanism 298 to force its piston 414 to the right end of the cylinder 413. At the same time, the flow of hydraulic pressure from the solenoid valve 411 flows through a conduit 415 to a cylinder 416 for forcing a piston 417 of the piston and cylinder mechanism 297 to the right end of the cylinder 416. With both pistons 414 and 417 forced to the right end of their cooperating cylinders 413 and 416, respectively, the Belleville springs 285 and 286 are released so that they apply a clamping pressure to the common bridge clamping member 250. The bridge clamping member 250, in turn, as previously described, acts on the movable clamping elements 310, 226 and 311 to effect a clamping action on the spindle support arms 45, 46 and 47, respectively. In order to relieve this clamping pressure applied through the movable clamping elements on the three spindle support arms 45, 46 and 47, a solenoid 420, associated with the solenoid valve 411, may be energized to actuate the valve for reversing the flow of hydraulic pressure to both piston and cylinder mechanisms 297 and 298 to force their respective pistons 417 and 414 to the left end of the cylinders 416 and 413. With the pistons 417 and 414 thus actuated, their cooperating piston rods 303 and 304, respectively engage the Belleville springs 285 and 286, as previously described, to compress the springs for relieving the clamping pressure applied by the springs through the common bridge clamping member 250 on the spindle support arms 45, 46 and 47.

It is therefore apparent that when all four solenoids 390, 405, 410 and 420 are deenergized, each of the spindle support arms 45, 46 and 47 is clamped at two points. Energization of the solenoid 420 will release the clamping pressure applied by the common bridge clamping member 250 on all three of the spindle support arms 45, 46 and 47 but each of these spindle support arms will continue to be clamped in position by its individually operable, stationary clamping element. However, any one of these spindle support arms 45, 46 or 47 may then be fully released for lateral movement by energizing the appropriate one of the solenoids 390, 405 or 410. The diagram in FIG. 10 illustrates the hydraulic circuit for controlling the clamping elements of the three spindle support arms 45, 46 and 47 which carry the spindles 35, 36 and 37, respectively. A similar hydraulic circuit is provided for each of the other three groups of spindles which are formed by the remaining seven spindles, but since the operation is identical to that described for the clamping elements of the spindle support arms 45, 46 and 47, the description of the other clamping elements and their associated hydraulic circuit has been omitted.

In the schematic presentation of the hydraulic circuit in FIG. 10, the various hydraulic elements are enclosed in broken lines which represent the main machine members with which those hydraulic elements are associated. Thus, the hydraulic circuit for the clamping elements of the spindle support arms are carried by the spindle head 25 and are therefore enclosed in a broken line which is identified by the reference numeral 25. In like manner, the drive unit 90 is represented by a broken line which is identified by the reference numeral 90, and contained within this broken line are the two cylinders 131 with their cooperating pistons 132 as well as the hydraulic servo motor 108, all of which are carried by the drive unit 90. The valves associated with these hydraulic elements are likewise enclosed within the broken line that is identified by the reference numeral 90. As previously described, the cylinders 131 with their cooperating pistons 132 are provided for actuating the clamping elements 133 to clamp the drive unit 90 in position on the ways 21 and 22 after the shot bolt 127 has been moved into its cooperating hole for locating the drive unit 90. The operation of the pistons 132 in the cylinders 131 is under the control of a solenoid valve 425 which is actuated by two solenoids 426 and 427. With the solenoid 427 energized, the valve 425 is in the condition illustrated in FIG. 10 for moving the pistons 132 to the upper end of the cylinders 131 for effecting the clamping action through the clamping elements 133 for locking the drive unit 90 in position. When the solenoid 427 is deenergized and the solenoid 426 is energized, the valve 425 is actuated to its opposite position for reversing the flow of hydraulic pressure to the cylinders 131. Such reversal in the direction of flow of the hydraulic pressure serves to move the pistons 132 to the lower end of the cylinder 131 for releasing the clamping elements 133 to permit the drive unit 90 to be moved freely along the ways 21 and 22 of the bed 20.

The drive unit 90 also carries the hydraulic servo motor 108 for revolving the screw 109 in either direction to move the automatic setup mechanism 95 in a horizontal direction along the ways 21 and 22. The hydraulic servo motor 108 is operated under the control of a servo valve 430 which operates in response to information received from the tape 117 by the tape reader 115 and transmitted to the electrical control circuit. The hydraulic fluid for operating the motor 108 is transmitted from the pump 367 through the pressure line 370 and a branch line 431 to the servo valve 430 from whence it is directed into a conduit 432 or a conduit 433, depending upon the desired direction of rotation of the motor 108. When the pressure is directed into the conduit 432 for actuating the motor 108, the conduit 433 serves as a return line while when the pressure is carried by the conduit 433 for rotating the motor 108 in the opposite direction, the conduit 432 carries the exhaust fluid from the motor 108. In any event, the exhaust fluid is directed by the servo valve 430 into a conduit 434 and it flows therefrom into a return line 435 to the conduit 388 which carries it back to the reservoir 365.

While the hydraulic servo motor 108 effects horizontal positioning of the automatic setup mechanism 95 for locating the spindle grip 98 in a horizontal direction, the motor 105 carried by the setup mechanism 95 operates to locate the spindle grip 98 in a vertical direction in response to the information obtained from the tape 117. The hydraulic servo motor 105 is operated under the control of a servo valve 440 which is actuated by the electrical control circuit in response to the information on the tape 117. The hydraulic pressure for operating the motor 105 is obtained from the main pressure line 370 and a branch line 441 which carries the pressure to a conduit 442 that is connected to the servo valve 440. The servo valve 440 directs the hydraulic fluid into either one of a pair of conduits 443 or 444 which are connected to the hydraulic servo motor 105. When the pressure is directed into the conduit 443 for driving the motor 105 in one direction of rotation, the conduit 444 serves as a return line to carry the exhaust fluid from the motor 105. On the other hand, when the hydraulic pressure from the conduit 442 is directed by the servo valve 440 into the conduit 444 for driving the motor 105 in the opposite direction of rotation, the conduit 443 serves as the exhaust line for carrying the exhaust fluid from the motor 105. In either case, the exhaust fluid is directed by the servo valve 440 into a conduit 445 which is connected to a conduit 446 that carries the exhaust fluid to the return line 435 for transmission to the reservoir 365 through the conduit 388. Thus, the spindle grip 98 is positioned in a horizontal direction by the hydraulic servo motor 108 under the control of the servo valve 430 and it is positioned in the vertical direction by the operation of the hydraulic servo motor 105 under the control of the servo valve 440. The servo valves 430 and 440, in turn, are operated in response to information contained on the tape 117. The spindle grip 98 is therefore positioned automatically in response to information contained on the tape 117 for positioning the spindles 35 to 44, inclusive, within the rectangular opening 99 and for operating the electrical control elements of the cycle control box 65 for establishing the cycle of operation of the spindle head 25.

In addition to the lateral positioning of the spindle grip 98 in a vertical direction and a horizontal direction by the hydraulic servo motors 105 and 108, respectively, the spindle grip must be moved axially to an advanced position and a retracted position for moving it into and out of engagement with the spindles of the spindle head 25 and the levers of the cycle control box 65. The cylinder 173 and piston 175 have been provided for this purpose, as previously described, and the piston is moved to the left end of the cylinder 173 or the right end of the cylinder by hydraulic pressure under the control of a solenoid valve 450. The valve 450 is normally actuated by a spring 451 to direct hydraulic pressure to the cylinder 173 on the right side of the piston 175 for forcing the piston 175 to the left end of the cylinder 173 to move the spindle grip 98 to its retracted position. With the valve 450 in its normal condition by operation of the spring 451, the hydraulic pressure flows from the pressure line 370 and the branch line 441 into a conduit 452 connected to the servo valve 450. The valve directs the hydraulic pressure from the conduit 452 into a conduit 453 that is connected to the cylinder 173. In order to advance the spindle grip 98 from the retracted position illustrated diagrammatically in FIG. 10, a solenoid 455 is energized to actuate the valve 450 in opposition to the force applied by the spring 451 for directing the flow of hydraulic pressure from the conduit 452 into a conduit 454 that is connected to the cylinder 173 on the left side of the piston 175. With hydraulic pressure directed to the left side of the piston 175, the latter is forced rightwardly to move the spindle grip 98 with it to its advanced position for engagement with the spindles of the spindle head 25 or the levers of the cycle control box 65.

The drive unit 90 and the automatic setup mechanism 95 are moved as a unit by the piston and cylinder mechanism 123 between the operating position illustrated in FIG. 1 and a parking position at the right end of the bed 20, as viewed in FIG. 1. The piston and cylinder mechanism 123 comprises a cylinder 459 and a cooperating piston 460 which is connected by the connecting rod 125 to the drive unit 90. The piston and cylinder mechanism 123 is actuated by hydraulic pressure under the control of a solenoid valve 461 which is actuated by a pair of solenoids 462 and 463. With the solenoid 463 energized, the valve is positioned as illustrated in FIG. 10 to direct hydraulic pressure to the cylinder 459 for actuating the piston 460 to advance the drive unit 90 and automatic setup mechanism 95 as a unit to their operating positions. With the valve 461 thus positioned, the hydraulic pressure flows from the pressure line 370 and the branch line 441 to a conduit 464 which is connected to the solenoid valve 461. The valve 461 directs the pressure from the conduit 464 into a conduit 465 that is connected to the cylinder 459 for advancing the piston 460 to move the drive unit 90 and its associated setup mechanism 95 to their operating positions.

The movement of the drive unit 90 and setup mechanism 95 to the parking position is effected by deenergizing the solenoid 463 and energizing the solenoid 462 to actuate the valve 461 to its opposite condition. When this occurs, the pressure in the conduit 464 is directed by the valve 461 into a conduit 466 which is connected to the opposite end of the cylinder 459 for forcing the piston 460 to its retracted position to effect a movement of the drive unit 90 and setup mechanism 95 to the parking position.

The ten spindles 35 to 44, inclusive, are rotated by the hydraulic servo motor 60 while the spindle head 25 is actuated in its feeding movement for feeding the several tools 75 into the workpiece by the hydraulic servo motor 30 with the rate of rotation of the two hydraulic servo motors 60 and 30 being established by the setting of the cycle control box 65. The hydraulic pressure for operating the servo motor 60 is obtained from the conduit 464 which is connected to the main pressure line 370 by the branch line 441. The conduit 464 is connected to a main solenoid valve 470 which is normally actuated to its closed condition by a spring 471 to interrupt the flow of hydraulic pressure. The main valve 470 is actuated to its open condition by energizing a solenoid 475 which serves to overcome the force of the spring 471 for opening the valve to admit the flow of hydraulic pressure into a conduit 471 which is connected to a servo valve 472. The servo valve 472 directs the hydraulic pressure into either a conduit 473 or a conduit 474 at a controlled rate for driving the spindles 35 to 44, inclusive, at a speed determined by the setting of the potentiometer 80 when the lever 78 of the cycle control box 65 was adjusted by the automatic setup mechanism 95. The exhaust fluid from the motor 60 is directed into either the conduit 473 or the conduit 474 to the servo valve 472 and thence into a conduit 476 for transmittal to the return line 435 via the branch line 446.

The spindle head 25 is driven in its feeding movement in a horizontal path of travel by the hydraulic servo motor 30, the power from the motor 30 being transmitted through a gear box 477 to rotate a screw 478 which is in threaded engagement with a nut (not shown) in well known manner for driving the spindle head 25 in its feeding movement. The rate of rotation of the feed motor 30 is under the control of a servo valve 480 in response to the setting of the potentiometer 70 in the cycle control box 65. The hydraulic pressure for driving the motor 30 is transmitted from the pressure line 370 through a branch line 481 to a main solenoid valve 482 that interrupts or admits the flow of hydraulic pressure to the servo valve 480. The main valve 482 is normally conditioned by a spring 483 to interrupt the flow of hydraulic pressure to the servo valve 480 but is actuated by energizing a solenoid 485 which overcomes the force of the spring 483 to open the valve 482 and admit pressure into a conduit 486 that is connected to the servo valve 480. The servo valve 480 directs the pressure from the conduit 486 into either one of two conduits 491 or 492, depending upon the required direction of rotation of the motor 30, the conduits being connected to carry the hydraulic pressure directly into the motor 30. When the conduit 491 is carrying pressure to the motor 30, the conduit 492 serves as a discharge conduit for carrying the exhaust from the motor 30 to the servo valve 480. On the other hand, when the direction of rotation of the motor 30 requires that the pressure be carried by the conduit 492, the conduit 491 carries the exhaust fluid from the motor 30 to the servo valve 480. In either case, the exhaust fluid is directed by the servo valve 480 into a conduit 493 which discharges into the reservoir 365.

As previously mentioned, the automatic setup mechanism 95 and the drive unit 90 are controlled by a electrical circuit in response to information obtained from the tape 117. The tape control circuit for regulating the operation of the motors 105 and 108 for laterally positioning the spindle grip 98 is illustrated diagrammatically in FIG. 11. Thus, the recorded data is extracted from the tape 117 by the tape reader and transcribes it into a usable form. coding circuit 501 which decodes the information from the tape reader and transscribes it into a usable form. The data is then transmitted from the decoding circuit 501 to a distributing circuit 502 which distributes the information from the decoding circuit 501 into two paths for controlling the motor 105 to establish the vertical movement of the spindle grip 98 and to the motor 108 for determining the horizontal movement of the spindle grip 98. The information pertaining to the vertical movement of the spindle grip 98 is transmitted from the distributing circuit 502 to a register 503 which stores the information until it is ready to be utilized in a discriminator circuit 504.

The information transmitted to the discriminator circuit 504 defines a specific position for the spindle grip 98 in its vertical path of travel. As previously mentioned, as the motor 105 rotates the screw 106 of the automatic setup mechanism 95, a feedback mechanism 170 is driven with the screw 106 to indicate at all times the position of the spindle grip 98 in its vertical path of travel. This information from the feedback mechanism 170 is transmitted to the discriminator circuit 504 where it is compared with the information obtained from the register 503. If the voltage from the feedback mechanism 170 does not correspond with the voltage from the register 503, the discriminator circuit 504 produces an error voltage or signal which indicates that the spindle grip 98 is not in the vertical position called for by the information from the register 503. The error signal from the discriminator circuit 504 is transmitted to a servo amplifier 505 and the amplified error voltage is transmitted from the servo amplifier 505 to the servo valve 440 which operates in the manner previously described to regulate the flow of hydraulic pressure to the servo motor 105. When the specified vertical position of the spindle grip 98 is achieved, the voltage from the feedback mechanism 170 will correspond with the voltage delivered by the register 503 to the discriminator circuit 504 and the latter will then produce no error voltage which will result in the termination of the operation of the motor 105 with the spindle grip accurately positioned in the specified location of its vertical path of travel.

The information for operating the motor 108 to position the spindle grip 98 in its horizontal path of travel is transmitted from the distributing circuit 502 to a register 510 which stores the information until it is ready to be utilized in a discriminator circuit 511. At the same time, the feedback mechanism 130 is driven with the screw 109 to indicate the position of the spindle grip 98 in its horizontal path of travel. This position information produced by the feedback mechanism 130 is fed back to the discriminator circuit 511 where it is compared with the information obtained from the register 510. If the information obtained from the feedback mechanism 130 does not correspond with the information received by the discriminator circuit 511 from the register 510, the discriminator circuit produces an error voltage which is transmitted to a servo amplifier 512. The servo amplifier 512 amplifies the error voltage and transmits the amplified voltage to the servo valve 430 which regulates the operation of the motor 108 in the manner previously explained in connection with the description of the hydraulic circuit shown in FIG. 10. When the information obtained from the feedback mechanism 130 corresponds to the information obtained from the register 510, the error voltage from the discriminator circuit 511 is terminated to indicate that the spindle 98 has been located in the specified position and the operation of the motor 108 is terminated. The various electrical circuits which operate in response to the information obtained from the tape 117 are illustrated in FIG. 11 as being enclosed in boxes and since the details of these circuits are well known in the art and are being used commercially for regulating the operation of positioning motors, the details of these circuits are neither illustrated nor described in this description.

In the electrical diagrams of FIGS. 12 and 13, the electrical elements are located in lines with each line being identified by a number having the prefix L. Each line is connected at one end to a direct current power line identified by the letters DC with its opposite end being connected to ground which is represented in the diagram by the line DCG. All of the relay coils are identified in the drawings by the letters CR with a number preceding the letters serving to identify relay coils from each other. The contacts associated with each relay coil bear the same reference number and letters as their cooperating coil but the letters CR are followed by a number which identifies each contact from the others of the same relay. The contacts which are actuated by information from the tape 117 are enclosed in squares formed of broken lines so that they may be readily identified.

The electrical circuit illustrated in FIG. 12 cooperates with the tape control circuit of FIG. 11 for controlling the cycles of operation of the automatic setup mechanism 95 in effecting the positioning of the spindles 35 to 44 and adjusting the cycle control box 65. The control circuit is energized by closing the contacts of a normally open start switch 520 to complete a circuit from the power line DC through the now closed start switch 520 and a normally closed stop switch 521 to the coil of a relay 1CR, the opposite side of which is connected to the ground represented by the line DCG. Energization of the relay coil 1CR serves to close its normally open contacts 1CR–1 and 1CR–2 in the line DC and the line DCG, respectively, to energize the circuit. In addition, the energization of the relay coil 1CR closes its normally open contact 1CR–3 in line L2 to establish a holding circuit for maintaining the relay 1CR energized when the start switch 520 is released. The circuit will therefore remain energized until the stop switch 521 is actuated to open its contact for breaking the circuit to the relay 1CR.

Although the closure of the master start switch 520 energizes the control circuit, the cycle will not start until a normally open cycle start switch 522 shown in line L24 is closed. However, prior to initiating the cycle by actuating the cycle start switch 522, the drive unit 90 and automatic setup mechanism 95 must be located in their operating position by operation of the piston and cylinder mechanism 123. To this end, a manually operated switch 523, which is located on the control panel 119 but is shown diagrammatically in line L3 and L4 of FIG. 12, must be actuated to move its contact 524 into bridging engagement with the cooperating terminals in line L4 for closing a circuit to energize the solenoid 463. As previously described, the solenoid 463 is associated with the solenoid valve 461 and, when energized, directs hydraulic pressure to the piston and cylinder mechanism 123 for advancing the drive unit 90 and automatic setup mechanism 95 to their operating position. When the contact 524 of the switch 523 is closed, its associated contact 525 is opened to deenergize the solenoid 462 which is also associated with the valve 461. When it is desired to retract the drive unit 90 and automatic setup mechanism 95 to their parking positions, the switch 523 is actuated to open the contact 524 and close the contact 525 to deenergize the solenoid 463 and energize the solenoid 462.

When the drive unit 90 and automatic setup mechanism 95 have been located at their operating positions, the drive unit 90 must be clamped in position by actuating the two pistons 132 and the cylinders 131. To this end, a manually operated switch 526 shown in line L5 and L6 is actuated to close its contact 527 and open its contact 528. The closure of the contact 527 in line L5 completes a circuit to the solenoid 427 for actuating the solenoid valve 425 in a direction to actuate the pistons 132 and the cylinders 131 to effect the clamping pressure through the clamping elements 133 for clamping the drive unit 90 in position on the bed 20. Prior to moving the drive unit 90 and the automatic setup mechanism 95 to their parking positions, the switch 526 will be actuated in the opposite direction to open the contact 527 and to close the contact 528 for deenergizing the solenoid 427 and energizing the solenoid 426 for reversing the flow of fluid pressure to the clamping cylinders 131.

With the drive unit 90 and the automatic setup mechanism 95 in the operating position by operation of the switch 523 and the drive unit 90 clamped to the bed 20 in the operating position by the operation of the switch 526, the cycle start switch 522 may be actuated to initiate the functioning of the automatic setup mechanism 95. It will be assumed for the purpose of this description that the automatic setup mechanism 95 will be cycled to position the three spindles 35, 36 and 37 in that order. The first step, of course, is to position the spindle grip 98 while it is in its retracted position, to bring it into axial alignment with the spindle 35. This is accomplished by actuating the cycle start switch 522 to its closed condition to complete a circuit for energizing the relay 8CR. Energization of the relay 8CR serves to actuate the tape reader 115 for moving the tape to bring the first block of information to the tape reader. The first block of information on the tape functions to close a normally open contact 529 in line L26 to energize a relay 9CR that has a contact (not shown) in the tape control circuit which is normally opened and becomes closed upon energization of the coil of the relay 9CR to permit the operation of the tape control circuit for actuating the motors 105 and 108 in a positioning movement. The first block of information at the tape reader calls for a positioning of the spindle grip 98 to bring it into alignment with the spindle 35 while the grip is in its retracted position.

The tape control circuit includes an error signal relay which remains deenergized while either one of the discriminator circuits 504 or 511 is sending an error signal voltage to its associated amplifier. When the spindle grip 98 has been located in the position called for by the block of information at the tape reader, the discriminator circuits 504 and 511 fail to produce an error signal voltage and operation of the motors 105 and 108 is terminated. The absence of an error signal voltage in the discriminator circuits 504 and 511 results in energization of the error signal relay (not shown) to close its normally open contact ECR–1 in line L25. The closure of the contact ECR–1 completes a circuit to again energize the relay 8CR for actuating the tape reader, the circuit being completed through the now closed contact ECR–1 and the closed limit switch 189 which is closed by virtue of the fact that the spindle grip 98 is in its retracted position. With the relay 8CR energized, the tape reader is actuated to bring the next block of information on the tape 117 to the tape reader. The new block of information does not provide for closing the contact 529 and the relay 9CR is therefore deenergized to open its associated contact in the tape control circuit so that operation of the motors 105 and 108 cannot occur. However, the new block of information at the tape reader provides for closing three tape controlled normally open contacts 530, 531 and 532 in lines L7, L16 and L21, respectively.

The closure of the contact 532 in line L21 serves to complete a circuit through the now closed contact 532 and the normally closed contact ECR-2 of the error signal relay (not shown) to the solenoid 455 for actuating the valve 450 for directing hydraulic pressure to the cylinder 173 of the spindle grip 98 to advance the grip into engagement with the spindle 35. When the spindle is fully advanced, the dog 186 actuates the limit switch 187 to close its contact and complete a circuit to the relay 7CR which is shown in line L23. Energization of the relay 7CR closes its normally open contact 7CR-1 in line L8 to complete a circuit to the solenoid 390 through the now closed tape controlled contact 530. Energization of the solenoid 390 functions to actuate the valve 360 for directing hydraulic pressure to the piston and cylinder mechanism 321 to shift the piston 383 and cause its piston rod 322 to compress the Belleville spring 320 for releasing the stationary clamp 312 which cooperates to clamp the spindle support arm 45 that carries the spindle 35 in position. At the same time, the closure of the contact 7CR-1 completes a circuit to a time delay relay 2CRT in line L9. The time delay relay 2CRT has a contact in the tape control circuit which functions in the same manner as the contact for the relay 9CR to initiate the operation of the positioning movement when the contact becomes closed by energization of its associated relay. However, the relay 2CRT is a time delay relay so that the closure of its contact is delayed momentarily until the bridge clamp member 250 is released so that lateral positioning of the spindle 35 may occur.

The release of the bridge clamp member 250 will occur by reason of the closure of the tape controlled normally open contact 531 in line L16 which completes the circuit to a relay 5CR. The circuit to the relay 5CR is completed through the now closed contact 531 and a normally closed contact 6CRT-1 of a time delay relay 6CRT to the relay 5CR. Energization of the relay 5CR closes its normally open contact 5CR-1 in line L17 to complete a circuit for energizing the solenoid 420 to actuate the valve 411. Actuation of the valve 411 by the solenoid 420 serves to direct fluid pressure to the two piston and cylinder mechanisms 297 and 298 which serve to compress the Belleville springs 285 and 286 in the manner previously described for releasing the clamping pressure applied by the bridge clamp member 250 to the three spindle support arms 45, 46 and 47 which carry the spindles 35, 36 and 37, respectively.

Therefore, with the stationary clamping element 312 release and the common bridge clamping member 250 released, the spindle support arm 45 may be moved laterally to position the spindle 35 in the desired location within the rectangular opening 99. After the bridge clamp member 250 has been released, the contact of the time delay relay 2CRT is closed in the tape control circuit to initiate the positioning movement. The tape control circuit therefore response to the information on the block of tape at the tape reader 115 to regulate the operation of the motors 105 and 108 for positioning the spindle grip 98 to the desired location of the spindle 35. Since the spindle grip 98 has been advanced into engagement with the spindle 35, the later will move with the spindle grip to be located in its new position.

When the spindle grip 98 and the spindle 35 with which it is engaged arrive at the specified location, there will be no error voltage in the discriminator circuits 504 and 511 so that the error signal relay will be energized. Energization of the error signal relay operates to open its normally closed contact ECR-2 in line L21 and to close its normally open contact ECR-1 in line L25. The opening of the contact ECR-2 in line L21 interrupts the circuit to the solenoid 455 so that the valve 450 is actuated by the spring 451 to reverse the flow of hydraulic pressure to the cylinder 173 and thereby retract the spindle grip 98 out of engagement with the spindle 35. Immediately after retraction of the spindle grip 98 occurs, its limit switch 187 will be released to its open condition to break the circuit to the relay 7CR. Deenergization of the relay 7CR opens its contact 7CR-1 in line L8 to interrupt the circuit to the solenoid 390 and the time delay relay 2CRT. Deenergization of the relay 2CRT opens its contact (not shown) in the tape control circuit so that further positioning of the spindle grip 98 cannot occur by operation of the tape control circuit until another contact in the tape control circuit is closed. At the same time deenergization of the solenoid 390 actuates the valve 360 to reverse the flow of hydraulic pressure to the piston and cylinder mechanism 321 and permits the Belleville spring 320 to apply a clamping pressure to the stationary clamping element 312 for holding the spindle 35 in the established position. The bridge clamp memer 250 will remain released but the single clamping element 312 will hold the spindle support arm 45 and its associated spindle 35 in the desired location. Although the deenergization of the relay 7CR opens its normally open contacts 7CR-2 in line L15, the relay 5CR remains energized through its closed contact 5CR-1 in line L17, a conductor 533 and the normally closed contact 6CRT-1. Since the relay 5CR remains energized, its closed contact 5CR-1 completes a circuit to retain the solenoid 420 energized so that the piston and cylinder mechanisms 297 and 298 will continue to operate to relieve the clamping pressure applied by the Belleville springs 285 and 286 to the bridge clamping member 250.

When the spindle grip 98 is fully retracted, it closes the normally open contact of the limit switch 189 to complete a circuit to the relay 8CR. Since there is no error signal voltage in the discriminator circuits 504 and 511, as previously mentioned, the error signal relay is energized so that its normally open contact ECR-1 in line L25 is closed and the circuit is completed to the relay 8CR through the now closed contact ECR-1 and the now closed contact of the limit switch 189 to the relay 8CR. Energization of the relay 8CR serves to actuate the tape reader for shifting the tape 117 to bring a new block of information at the tape reader.

The data from the new block of tape at the reader 115 closes the contact 529 for again energizing the relay 9CR to close its contact in the tape control circuit so that the motors 105 and 108 may be operated in accordance with the information on the new block of tape at the reader to position the spindle grip 98 for bringing it into alignment with the spindle 36. When such positioning has occurred, the error signal relay (not shown) in the tape control circuit will be energized by the absence of an error signal voltage in the discriminator circuits 504 and 511 to close its normally open contact ECR-1 in line L25 for again completing a circuit to the relay 8CR. The current will flow to the relay 8CR through the now closed contact ECR-1 and the now closed contact of the limit switch 189 which remains closed by the retracted position of the spindle grip 98. The energization of the relay 8CR serves to again actuate the tape reader 115 to bring a new block of tape to the tape reader for transmitting new information. The new block of tape does not call for the closing of the contact 529 so that the relay 9CR is deenergized to open its contact in the tape control circuit. The positioning of the spindle grip 98 therefore cannot commence immediately until another contact in the tape control circuit is closed by energization of a time delay relay 3CRT. However, the new block of tape at the tape reader 115 calls for closure of a normally open tape controlled contact 540 in line L10 and also closes the normally open tape controlled contact 532 in line L21.

The closure of the contact 532 completes a circuit from the power line DC through the now closed contact 532 and a normally closed contact ECR–2 to energize the solenoid 455. The contact ECR–2 is in its normal closed condition because the error signal relay in the tape control circuit is deenergized by virtue of the fact that coincidence does not exist between the information on the tape at the tape reader and the position of the spindle grip 98. Energization of the solenoid 455 actuates the valve 450 for directing hydraulic pressure to the cylinder 173 to advance the spindle grip 98 into engagement with the spindle 36. Such axial movement of the spindle grip 98 opens the limit switch 189 and closes the limit switch 187. The closure of the contact of the limit switch 187 by the advancement of the spindle energizes the relay 7CR to close its contact 7CR–1 in line L8. The closure of the contact 7CR–1 completes a circuit through the now closed contact 7CR–1 and a conductor 541 to the now closed tape controlled contact 540 and thence to the solenoid 405 to return to its source represented by the line DCG. The energization of the solenoid 405 actuates the valve 395 to direct hydraulic pressure to the piston and cylinder mechanism 241 to cause it to compress the Belleville spring 237 for releasing the stationary clamping element 227. Since the bridge clamp member continues to be released, the release of the stationary clamp element 227 renders the spindle support arm 46 movable so that its associated spindle 36 may be positioned within the rectangular opening 99. At the same time that the solenoid 405 is energized, the time delay relay 3CRT is energized so that its contact in the tape control circuit is closed after a momentary delay to actuate the tape control circuit for initiating the operation of the motors 105 and 108 to position the spindle grip 98 in accordance with the information contained on the block of tape at the tape reader 115. Since the spindle grip 98 is in engagement with the spindle 36, the latter will move with it to be located at the new predetermined position as recorded on the tape 117.

When coincidence is obtained between the information on the block of tape at the reader 115 and the location of the spindle grip 98, the error signal voltages from the discriminator circuits 504 and 511 will be nullified and the error signal relay (not shown) in the tape control circuit will be energized. Energization of the error signal relay (not shown) will open its normally closed contact ECR–2 in line L21 to interrupt the circuit to the solenoid 455. The deenergization of the solenoid 455 will cause the valve 450 to be actuated to reverse the flow of hydraulic pressure to the cylinder 173 for retracting the spindle grip 98 out of engagement with the spindle 36. As the spindle grip 98 leaves its advance position, it releases the limit switch 187 to cause its contact to open and thereby deenergize the relay 7CR. Deenergization of the relay 7CR opens its normally open contact 7C–1 in line L8 to interrupt the circuit to the time delay relay 3CT and to the solenoid 405. Deenergization of the solenoid 405 will actuate the valve 395 for reversing the flow of hydraulic fluid to the piston and cylinder mechanism 241 for releasing the Belleville spring 237 and permitting the clamping pressure to be applied to the spindle support arm 46 which supports the spindle 36. The stationary clamping element 227 will therefore be actuated to retain the spindle 36 in the established position. The bridge clamp member 250, however, remains released by energization of the solenoid 420 through the now closed contact 5CR–1 in line L17.

The energization of the error signal relay (not shown) in the tape control circuit also closes its normally open contact ECR–1 in line L25 and when the spindle grip 98 arrives at its fully retracted position, its limit switch 189 is actuated to close its contact. This completes a circuit from the power line DC, through the now closed contact ECR–1 and the now closed contact of the limit switch 189 to the relay 8CR. Energization of the relay 8CR actuates the tape reader for bringing a new block of tape to the reader. The new block of tape provides for again closing the tape controlled contact 529 in line L26 to energize the relay 9CR for closing its contact in the tape control circuit to actuate the latter for operating the motors 105 and 108. The new block of tape at the tape reader 115 also contains the information required for regulating the operation of the motors 105 and 108 to position the spindle grip 98 for bringing it into axial alignment with the spindle 37. When such positioning of the spindle grip 98 is completed, coincidence will exist between the information on the tape at the reader and the position of the spindle grip 98 to nullify the error signal voltages from the discriminator circuits 504 and 511 and thereby energize the error signal relay (not shown) in the tape control circuit. Energization of the error signal relay (not shown) will close its normally open contact ECR–1 in line L25 and since the spindle grip 98 continues to be fully retracted to retain the limit switch 189 actuated to close its contact, the circuit will again be completed to the relay 8CR for actuating the tape reader 115 to bring a new block of tape at the reader. The new block of tape will permit the contact 529 to open so that the relay 9CR will be deenergized to preclude the operation of the motors 105 and 108 until the clamp for the spindle support arm 47 has been released. The new block of tape, however, does contain data which causes the closing of four normally open tape controlled contacts which are a contact 542 in line L12, a contact 543 in line L15, a contact 544 in line L19, and the contact 532 in line L21. The closing of the normally open contact 544 in line L19 completes a circuit to energize a time delay relay 6CRT, the current flowing through the new closed contact 5CR–1 in line L17 through a conductor 545 to the now closed tape controlled contact 544 and thence to the time delay relay 6CRT. The energization of the time delay relay 6CRT operates to open its normally closed contact 6CRT–1 in line L16 but there is a sufficient delay in the operation of this relay to permit closing of the contact 7CR–2 in line L15 to avoid interrupting the circuit to the relay 5CR and thereby prevent deenergizing the solenoid 520 which would cause a clamping action by the common bridge clamping member 250.

The closure of the tape controlled contact 532 in line L21 completes a circuit to the solenoid 455 through the closed contact 532 and the normally closed contact ECR–2 to the deenergized error signal relay (not shown) in the tape control circuit. The energization of the solenoid 455 actuates the valve 450 for directing hydraulic pressure to the cylinder 173 to advance the spindle grip 98 into engagement with the spindle 37. As the spindle grip 98 leaves its retracted position, the limit switch 189 is opened and when the spindle grip 98 is fully advanced into engagement with the spindle 37, the limit switch 187 is closed to complete a circuit for energizing the relay 7CR.

The energization of the relay 7CR closes its contact 7CR–2 in line L15 so that the circuit is retained to the relay 5CR through the now closed contact 5CR–1, the conductor 533, the now closed tape controlled contact 543 and the now closed contact 7CR–2 in line L15 to the relay 5CR. Energization of the relay 5CR retains its contact 5CR–1 in line L17 closed to maintain the solenoid 420 energized and thereby prevent the clamping action from being applied by the bridge clamp member 250. The energization of the relay 7CR also closes its contact 7CR–1 in line L8 to complete a circuit through the now closed contact 7CR–1, the conductor 541 and the now closed tape controlled contact 542 to the solenoid 410 and a time delay relay 4CRT. Energization of the relay 4CRT closes its contact (not shown) in the tape control circuit for initiating the energization of the motors 105 and 108. However, the closure of this contact is delayed momentarily until the stationary clamp 313 is released. The energization of the solenoid 410 serves to release the stationary clamp 313 by actuating the valve 406 to direct hydraulic pressure to the piston and cylinder mechanism 326 for compressing the Belleville springs 325 to release the clamping action applied through the stationary clamping element 313. With the stationary clamping element 313 released and the movable clamping element 311 released by action of the bridge clamp member 250, the spindle support arm 47 may be moved laterally to position the spindle 37 in the rectangular opening 99.

Shortly after the stationary clamping element 313 has been released by energization of the solenoid 410, the contact of the time delay relay 4CRT in the tape control circuit is closed to permit energization of the motors 105 and 108 under the control of the tape control circuit in response to the information contained on the block of tape at the tape reader 115. This causes lateral positioning of the spindle grip 98 while it is in engagement with the spindle 37 to locate the latter in the desired position as recorded on the block of tape at the reader 115. When the desired positioning has occurred, the error signal relay (not shown) in the tape control circuit will be energized by the absence of an error signal voltage in the discriminator circuits 504 and 511. The energization of the error signal relay (not shown) functions to open its normally closed contact ECR-2 in line L21 to interrupt the circuit to the solenoid 455. Deenergization of the solenoid 455 serves to actuate the valve 450 for reversing the flow of hydraulic pressure to the cylinder 173 for retracting the spindle grip 98 out of engagement with the spindle 37. As the spindle grip 98 begin its retracting movement, but before it has released the spindle 37, the dog 186 on the spindle grip 98 releases the limit switch 187 to permit its contact to move to the open position. Opening of the limit switch 187 deenergizes the relay 7CR in line L23 to open its normally open contact 7CR-1 in line L8. The opening of the contact 7CR-1 in line L8 breaks the circuit to the solenoid 410 and to the time delay relay 4CRT. Deenergization of the time delay relay 4CRT opens its contact in the tape control circuit to prevent actuation of the motors 105 and 108. The deenergization of the solenoid 410 serves to actuate the valve 406 for reversing the flow of hydraulic pressure to the piston and cylinder mechanism 326 for releasing the Belleville spring 325 and permitting the latter to apply the clamping pressure to the stationary clamping element 313 for locking the spindle support arm 47 and its associated spindle 37 in the established position.

Since all three spindles 35, 36 and 37 which are associated with the common bridge clamp member 250 have been now positioned, the clamping pressure may be applied to the bridge clamp member 250 for securely locking the three spindles in the established position. Therefore, the deenergization of the relay 7CR causes the opening of its normally open contact 7CR-2 in line L15 and since the contact 6CRT-1 in line L16 has been previously opened by energization of the time delay relay 6CRT, the circuit is broken to the relay 5CR. This opens its normally open contact 5CR-1 in line L17 to interrupt the circuit to the solenoid 420. The deenergization of the solenoid 420 functions to actuate the valve 411 for directing hydraulic pressure to the piston and cylinder mechanisms 297 and 298 for releasing the two Belleville springs 285 and 286 to permit them to apply a clamping action to the common bridge clamp member 250 for clamping all three of the spindle support arms 45, 46 and 47 in the desired position.

When the spindle grip 98 moves to its fully retracted position the dog 188 will actuate the limit switch 189 to its closed position and the energization of the error signal relay (not shown) in the tape control circuit will close its normally open contact ECR-1 in line L25 to again complete a circuit to the relay 8CR. Energization of the relay 8CR operates to again actuate the tape reader 115 for bringing a new block of tape to the reader and the information thereon will initiate the positioning of the next group of spindles 38 and 39 which are both clamped in position by another common bridge clamping member 336. The positioning cycle for this group of spindles as well as for the other two groups of spindles is identical to the cycle described for the spindles 35, 36 and 37 which comprise the first group and the electrical circuit for effecting such positioning cycle will be identical to that illustrated in FIG. 12. The description of the positioning cycle will therefore not be repeated for the other three groups of spindles.

The electrical control circuit for regulating the feed cycle of the spindle head 25 is illustrated in FIG. 13. As previously mentioned, the feed cycle for the spindle head 25 is established by the automatic setup mechanism 95 operating in response to information contained on the tape 117 to adjust the cycle control box 65. Such adjustment is achieved by the vertical movement of four levers 66, 78, 82 and 92 to adjust the position of the sliders of four potentiometers that are enclosed in the housing 68 of the cycle control box 65 and which are shown diagrammatically in FIG. 13. Thus, the lever 66 of the cycle control box 65 is connected to move the slider 69 of the potentiometer 70 for establishing the feed rate of the spindle head 25. In like manner, the lever 78 is connected to the slider 81 for moving it along the potentiometer 80 for establishing the rate of rotation of the ten spindles of the head 25. The lever 82 of the cycle control box 65 is connected to move a slider 83 of a potentiometer 85 for positioning a dog 87 to determine what portion of the travel of the spindle head 25 will be at a rapid rate and what portion of the travel will be at a feed rate. In like manner, the lever 92 is connected to a slider 91 of a potentiometer 89 for adjusting the position of the slider 91 to relocate a dog 88 which establishes the termination of the forward feeding movement and reverses the direction of travel of the spindle head for retracting it after the completion of a machining operation. The cycle control box 65 also includes a lever 146 which may be moved in a horizontal direction for opening and closing a switch 145 which is closed to condition the electrical circuit for a tapping operation. Therefore, enclosed within the housing 68 of the cycle control box 65 are the tap selector switch 145 and the four potentiometers 70, 80, 89 and 85 which are all illustrated diagrammatically in the electrical circuit depicted in FIG. 13.

The mechanical structure for adjusting the position of the dogs 87 and 88 are illustarted in FIG. 9. The mechanism is supported on a bracket 550 which is mounted on the side of the transverse bed extension 23 directly beneath the spindle head 25. The motor 86 is mounted on the bracket 550 and its drive shaft is connected to rotate a screw 551 that is journalled at its opposite end in a bearing block 552. The screw 551 is in threaded engagement with a nut 553 to effect movement of the nut along the length of the screw. A slider 554 of a potentiometer 555 is secured to the nut 553 to move with it, the slider 554 extending downwardly from the nut into an elongated slot 556 formed in the housing of the potentiometer 555. As the motor 86 is energized to rotate the screw 551, the nut 553 will be moved in either direction along the length of the screw 551 depending upon its direction of rotation to adjust the position of the dog 87 which is attached to the nut 553 and extends upwardly therefrom. At the same time the axial movement of the nut 553 functions to effect a like movement of its associated slider 554 to vary the voltage that is delivered from the potentiometer 555. The nut 553 is precluded from rotating with the screw 551 because of the location of the slider 554 in the slot 556. The dog 87 is located in position to be engaged by a limit switch 560 as the spindle head 25 is moving in its path of travel for actuating the limit switch to its closed position to change the rate of movement of the spindle head from a rapid rate to a feed rate during its advancing movement and to change the rate of movement from a feed rate to a rapid rate during its retracting movement.

A second motor 561 is mounted on the bracket 550 and has its drive shaft connected to rotate a screw 562 which has its opposite end journalled in a bearing block 563 that is carried by the bracket 550. The screw 562 is in threaded engagement with a nut 564 which carries a slider 565 of a potentiometer 566 with the slider 565 depending from the nut 564 and extending into an elongated slot 567 formed in the housing of the potentiometer 566. Since the slider 565 is secured to the nut 564 and extends into the slot 567, the nut 564 canot rotate with the screw 562. As a result, rotation of the screw 562 by the motor 561 will cause an axial movement of the nut 564 along the screw and the slider 565 will move with it to adjust the potentiometer 566. In addition, the dog 88 is mounted on the screw 564 and extends upwardly therefrom in position to be engaged by a limit switch 570 which is carried by the spindle head 25 to move with it. The limit switch 570 is connected in the electrical control circuit, as will be subsequently described, so that when it is actuated it terminates the forward feeding movement of the spindle head 25 and reverses the movement to retract the spindle head from its advanced position.

A third limit switch 575 is carried by the spindle head 25 in position to be engaged by a dog 576 which is fixed to the bearing block 552 and extends toward the spindle head 25 in position to be engaged by the limit switch 575 when the spindle head is in its fully retracted position to actuate the limit switch 575 to its closed condition for terminating the movement of the spindle head.

The electrical circuit for regulating the adjustment of the dogs 87 and 88 in response to the setting of the cycle control box 65 is illustrated in FIG. 13. The vertical movement of the lever 82 functions to adjust the slider 83 of the potentiometer 85 which is located within the housing 68 of the cycle control box 65. A D.C. voltage is transmitted from the power line DC through a conductor 577, the potentiometer 85 and its slider 83 to a conductor 578 which transmits the voltage to a control amplifier 580. As the position of the slider 83 is adjusted along the potentiometer 85 by the movement of the lever 82 the voltage which is transmitted through the potentiometer 85 to the control amplifier 580 will be varied. Another voltage is transmitted to the control amplifier 580 through the potentiometer 555. This voltage originates at the power line DC and is transmitted through a conductor 581 and the potentiometer 555 through its slider 554 to a conductor 582 which carries the voltage to the control amplifier 580. The voltage that is transmitted to the control amplifier 580 through the potentiometer 555 will likewise be varied by adjusting the position of the slider 554 with respect to its potentiometer 555. The two voltages that are transmitted to the control amplifier 580 are compared in the amplifier, in well known manner, and if they are not in coincidence an error voltage will be produced which is transmitted through a conductor 583 for energizing the motor 86 to rotate the screw 551. The amplifier 580 is equipped with a polarized relay which will determine the direction of rotation of the motor 86 to obtain the coincidence between the two voltages which are transmitted to the control amplifier 580. The rotation of the screw 551 will cause an axial movement of the nut 553 and since the slider 554 is secured to the nut 553 it will move with it for adjusting its position along the potentiometer 555. As the position of the slider 554 is adjusted, the voltage transmitted through the potentiometer 555 varies accordingly and when the voltage through the potentiometer 555 corresponds to the voltage through the potentiometer 85 the error signal produced by the control amplifier 580 will be nulled to deenergize the motor 86 for terminating the rotation of the screw 551. When this occurs, the dog 87 will be located in the desired position as determined by the setting of the cycle control box 65 for establishing the point in the forward movement of the spindle head 25 at which the limit switch 560 will be actuated by engagement with the dog 87 to change the rate of forward movement of the spindle head 25 from a rapid rate to a feed rate. On the other hand, the actuation of the limit switch 560 during the retracting movement of the spindle head 25 by engagement with the dog 87 will serve to change the rate of retraction from a feed rate to a rapid rate.

An identical mechanism is provided for setting the dog 88 which serves to actuate the limit switch 570 for limiting the advancing forward movement of the spindle head 25. The location of the dog 88 may be adjusted by moving the lever 92 of the cycle control box 65 either manually by the operator or automatically by the automatic setup mechanism 95 in response to information contained on the tape 117. As the lever 92 is moved laterally, the slider 91 of the potentiometer 89 moves with it to vary the voltage that is transmitted from the potentiometer 89 to a control amplifier 585. Another voltage is transmitted to the control amplifier 585 from the potentiometer 566. These two voltages are compared in the control amplifier 585 and if they do not coincide an error voltage is developed which is transmitted for energizing the motor 561. The control amplifier 585 also includes a polarized relay for determining the direction in which the motor 561 will be rotated. The energized motor 561 functions to rotate the screw 562 for moving the nut 564 along its length to adjust the position of its cooperating slider 565. When the slider 565 is located in the position on the potentiometer 566 for producing a voltage which coincides with the voltage produced through the poentiometer 89 the error signal produced by the control amplifier 585 will be nulled to deenergize the motor 561 and terminate the rotation of the screw 562. The dog 88 carried by the nut 564 will then be located in the desired position as determined by the setting of the cycle control box for adjusting the potentiometer 89 to establish the position at which the limit switch 570 will be actuated by engagement with the dog 88 for terminating the forward feeding movement of the spindle head 25. The control amplifiers 580 and 585 are well known in the art, and are produced commercially, so that details of these circuits have not been illustrated or described, but have been represented in FIG. 13 by a box.

It will be recalled from the description of the hydraulic circuit that the spindle drive motor 60 is a hydraulic motor that is actuated by hudraulic pressure under the control of the servo valve 472 for regulating its rate of rotation. In like manner, the rate of operation of the hydraulic feed motor 30 for driving the spindle head 25 in its path of travel is controlled by the servo valve 480. The setting of the servo valves 472 and 480 may be adjusted by the lateral movement of the levers 78 and 66 respectively of the cycle control box 65 for varying the rate of rotation of the motors 60 and 30. To this end, the lever 78 of the cycle control box 65 is connected to the slider 81 of the potentiometer 80 so that the slider will move with the lever 78 to adjust the potentiometer 80 when the lever is moved vertically. The slider 81 of the potentiometer 80 is connected to transmit a voltage from the potentiometer to a push-pull type servo amplifier 590 which is connected to control the adjustment of the servo valve 472. In order to obtain a feedback signal for indicating the rate of rotation of the motor 60, the latter is connected to drive a tachometer 591 which is shown in FIG. 1 and diagrammatically in FIG. 13. The voltage produced by the tachometer 591 is also transmitted to the servo amplifier 590 where it is compared with the voltage obtained from the potentiometer 80. If the voltages do not coincide, the rotation of the hydraulic motor 60 does not correspond with the adjustment of the cycle control box 65 and an error voltage will be produced by the servo amplifier 590 for adjusting the servo valve 472 to control the flow of hydraulic pressure to the motor 60 for effecting the desired rate of rotation of the 10 spindles 35 to 44, inclusive.

The rate of rotation of the feed motor 30 is regulated in the same manner for controlling the rate of the feeding movement of the spindle head 25 for feeding the cutters 75 into a workpiece. Thus, the vertical movement of the lever 66 of the cycle control box 65 operates to adjust the slider 69 of the potentiometer 70 for varying the voltage which is transmitted to a push-pull type servo amplifier 595. The hydraulic motor 30 is also connected to drive a tachometer 596 which is depicted in FIG. 1 and schematically in FIG. 13. The voltage from the tachometer 596 is transmitted to the servo amplifier 595 where it is compared with the voltage obtained from the potentiometer 70. If the two voltages transmitted to the servo amplifier 595 do not coincide, an error voltage is produced for adjusting the servo valve 480 to vary the rate of rotation of the hydraulic motor 30 until it corresponds with the setting of the feed rate lever 66 in the cycle control box 65. The push-pull type amplifiers 590 and 595 are also well known in the art and are commercially available so that the details of their circuits have been neither illustrated nor described but have been represented by boxes in FIG. 13.

The electrical control circuit for effecting the feed cycle of the spindle head 25 is illustrated in the lower portion of FIG. 13 with the lines containing the electrical components of the control circuit being identified by the reference numerals L27 to L36. The feed cycle is initiated by actuating a normally open start switch 601 to complete a circuit through the start switch 601 and a normally closed stop switch 602 to a relay 10CR. Energization of the relay 10CR closes its normally open contact 10CR-1 in line L28 to complete a holding circuit for retaining the relay 10CR energized when the start switch 601 is released. This holding circuit is completed through the now closed contact 10CR-1 and the normally closed contact 14CR-2 through the stop switch 602 to the relay 10CR. In addition, a closure of the contact 10CR-1 energizes the solenoids 475 and 485 of the main valves 470 and 482 respectivley. The circuit to the solenoid 475 is completed through the now closed contact 10CR-1 and the normally closed contact 14CR-2 to a conductor 603 which transmits the current to the solenoid 475. A conductor 604 in line L29 carries the current for energizing the solenoid 485. With the solenoid 475 energized, the main valve 470 is opened to admit fluid pressure to the spindle drive servo valve 472. In like manner, energization of the solenoid 485 opens its associated main valve 482 for admitting pressure to the feed drive servo valve 480.

The energization of the relay 10CR also closes its two normally colsed contacts 10CR-2 and 10CR-3 for completing the circuits to the servo amplifiers 590 and 595 respectively. Closure of the normally open contact 10CR-2 completes a circuit through a normally closed contact 15CR-1, the potentiometer 80 and its cooperating slider 81 to a conductor 605 and thence through the now closed contact 10CR-2 to the servo amplifier 590 for controlling the servo valve 472. With the main valve 470 open to admit pressure to the servo valve 472 and the circuit to the servo amplifier 590 completed by closure of the contact 10CR-2 the spindles 35 to 44 inclusive will be rotated at the rate established by the setting of the potentiometer 80.

The feeding movement of the spindle head 25 in a forward direction will also be initiated by energization of the relay 10CR by virture of the fact that the main valve 482 was opened by energization of the solenoid 485 and the circuit to the servo amplifier 595 was completed by the closure of the contact 10CR-3. The circuit to the servo amplifier 595 is completed through the normally closed contact 13CR-4 and the normally closed contact 12CR-1 through a conductor 606 and the now closed contact 10CR-3 to the servo amplifier 595. It will be noted that the feed rate control potentiometer 70 has been shunted by the conductor 606 so that the full power from the powerline DC is transmitted to the servo amplifier 595 for opening the servo valve 480 to actuate the feed drive motor 30 at a fast rate for driving the spindle head 25 at its rapid rate of travel. The spindle head 25 will continue to move at this rapid rate of travel until the limit switch 560 that is carried by the spindle head 25 engages the dog 87 for actuating the limit switch 560 to its closed condition. The limit switch 560 is illustrated diagrammatically in line L30 and its closure completes a circuit to energize a relay 11CR.

Energization of the relay 11CR closes its contact 11CR-1 in line L31 to complete a circuit for energizing the relay 12CR through the now closed contact 11CR-1 in line L31, the normally closed contact 13CR-1 and a conductor 608 to the normally closed contact 13CR-2 in line L32 and thence to the relay 12CR. As the spindle head 25 continues in its feeding movement it will release the limit switch 560 permitting it to open to deenergize the relay 11CR. The contact 11CR-1 in line L31 will therefore open but the relay 12CR will remain energized through a holding circuit established by the closure of its contact 12CR-2 in line L32. The holding circuit is completed through the now closed contact 12CR-2 and a normally closed contact 13CR-2 to the relay 12CR. The energization of the relay 12CR serves to interrupt the circuit to the servo amplifier 595 through the conductor 606 for operating the motor 30 at the fast rate by opening its normally closed contact 12CR-1 in the conductor 606. However, a feed rate circuit through the potentiometer 70 is completed by closure of the contact 12CR-3 in a conductor 607 to complete another circuit to the servo amplifier 595 through the normally closed contact 13CR-4 to the potentiometer 70 and through its slider 69 to the now closed contact 12CR-3. From the contact 12CR-3 the circuit continues through the conductor 607 and the now closed contact 10CR-3 to the servo amplifier 595. The servo amplifier 595 then responds to the setting of the potentiometer 70 for regulating the servo valve 480 which controls the flow of hydraulic pressure to the servo motor 30 for moving the spindle head 25 at the desired feed rate.

The spindle head 25 will continue to move forwardly at the established feed rate for performing the machining operation. When the operation is completed the limit switch 570 will engage the dog 88 to be actuated to its closed condition for completing a circuit to the relay 13CR illustrated in line L33. The circuit to the relay 13CR is completed through the now closed contact of the limit switch 570 and the normally closed contact 14CR-1 to the relay 13CR. Energization of the relay 13CR closes its contact 13CR-3 in line L34 to complete a holding circuit which shunts the limit switch 570 so that the relay 13CR will remain energized even though the limit switch 570 is released to its open condition immediately after the retracting movement of the spindle head 25 is initiated. Energization of the relay 13CR opens its normally closed contacts 13CR-1 in line L31 and 13CR-2 in line L32 but the opening of these contacts has no effect at this time because the relay 12CR remains energized through the closed contact 12CR-2 in line L32, a conductor 608 and the normally closed contact 11CR-2 in line L31.

The energization of the relay 13CR also reverses the polarity of the current directed to the servo amplifier 595 for reversing the rotation of the feed motor 30 to effect a retraction of the spindle from its advanced position. This is accomplished by opening the normally closed contact 13CR-4 to interrupt the circuit to the servo amplifier 595 from the power line DC. However, at the same time a normally open contact 13CR-5 is closed by energization of the relay 13CR to complete a circuit from a power line DC-2 which is of the opposite polarity and causes the servo amplifier 595 to actuate the servo valve 480 for rversing the rotation of the feed drive motor 30. Although the polarity of the current is reversed, the circuit continues through the potentiometer 70 through the servo amplifier 595 for retracting the spindle head 25 at the feed rate.

During normal machining operations, the spindles 35 to 44 will continue to rotate in the forward direction during the retracting movement. However, in a tapping operation it is necessary to reverse the direction of rotation of the spindles during the retracting movement to accommodate the threads which have been formed in the workpiece. It is for this reason that the switch 145 is provided in the cycle control box 65 for actuation by the movement of the lever 146. When a tapping operation is to be performed, the switch 145 shown diagrammatically in line L36 of FIG. 13 is actuated to its closed condition. When the relay 13CR is energized by actuation of the limit switch 570 when the forward feeding movement of the spindle head has been completed, it closes a contact 13CR-6 in line L36 to complete a circuit to a relay 15CR. The circuit of the relay 15CR is completed through the now closed limit switch 145 and the now closed contact 13CR-6 to the relay 15CR. Energization of the relay 15CR opens its normally closed contact 15CR-1 to interrupt the circuit from the power line DC through the potentiometer 80 to the servo amplifier 590 but completes another circuit from the power line DC-2 of opposite polarity through the now closed contact 15CR-2 and the potentiometer 80 to the servo amplifier 590. The reverse polarity of the current to the servo amplifier 590 causes it to adjust the servo valve 472 for directing hydraulic pressure to actuate the motor 60 in the reverse direction and thereby cause a rotation of all ten spindles 35 to 44 in the reverse direction during the retracting movement.

Irrespective of the direction of rotation of the spindles during the retracting movement, the retracting movement will initially take place at a feed rate. The feed rate will continue until the limit switch 560 moves into engagement with the dog 87 to be actuated to its closed condition to energize the relay 11CR. Energization of the relay 11CR opens its normally closed contact 11CR-2 in line L31 and since the relay 13CR remains energized its normally closed contact 13CR-2 in line L32 is open so that the circuit to the relay 12CR is interrupted to deenergize the relay. Deenergization of the relay 12CR opens its contact 12CR-3 to interrupt the feed rate circuit from the potentiometer 70 to the servo amplifier 595. However, the deenergization of the relay 12CR closes its normally closed contact 12CR-1 to complete a circuit for connecting the servo amplifier 595 directly to the power line DC-2. This circuit is completed from the power line DC-2 through the now closed contact 13CR-5 to the conductor 609. From the conductor 609 the circuit continues through the closed contact 12CR-1, the conductor 606 and the now closed contact 10CR-3 to the servo amplifier 595 which then operates to adjust the servo valve 480 for directing hydraulic pressure to the motor 30 to retract the spindle head 25 at a rapid rate.

Retraction of the spindle head 25 at the rapid rate continues until the limit switch 575 that is carried by the spindle head 25 contacts the dog 576 which causes the switch to be actuated to close its contacts as shown in line L35 of FIG. 13. The closing of the contact of the limit switch 575 completes a circuit for energizing a relay 14CR. Energization of the relay 14CR opens its normally closed contact 14CR-1 in line L33 to interrupt the circuit to the relay 13CR for restoring all of its contacts to their normal conditions. The deenergization of the relay 13CR will open its contact 13CR-6 in line L36 to interrupt the circuit to the relay 15CR for restoring its contacts 15CR-1 and 15CR-2 to their normal conditions if the switch 145 had been actuated to close its contact for performing a tapping operation.

Energization of the relay 14CR opens its normally closed contact 14CR-2 in line L28 to deenergize the relay 10CR and also deenergize the two solenoids 475 and 485. Deenergization of the solenoids 475 and 485 actuate the main valves 470 and 482 to their closed positions for terminating the flow of hydraulic pressure to the two servo valves 472 and 480 to thereby stop the rotation of the hydraulic motors 60 and 30. The deenergization of the relay 10CR results in the opening of its contacts 10CR-2 and 10CR-3 to interrupt the electric circuits to the servo amplifiers 590 and 595 respectively. The feed cycle control circuit illustrated in FIG. 13 is then conditioned for the next feeding cycle which will be initiated by again closing the cycle start switch 601.

The automatic setup mechanism 95 has been described and illustrated as being arranged for setting a single machine tool in response to information contained on a tape. However, it is to be understood that the automatic setup mechanism 95 with its associated drive unit 90 is particularly well adapted for being operated from a single tape reader or other source of predetermined data and the accompanying control circuit for automatically setting a battery of machines in a production line so that a large number of machines may be operated with a minimum of attenuation by the operator. With this arrangement the one setup mechanism functioning under the control of an independent single control circuit will operate to adjust a plurality of machine tools in a production line for achieving completely automatic operation with a minimum investment. Thus, the separate control circuit illustrated in FIG. 12 functions in conjunction with the tape control circuit of FIG. 11 for regulating the operation of the setup mechanism to adjust the machine tool and only one of each of these separate circuits can be utilized to control the setup mechanism 95 for adjusting a plurality of machine tools. On the other hand, the control circuit depicted in FIG. 13 is associated with the individual machine tool and although adjustable by the setup mechanism 95 it functions independently of the circuits illustrated in FIGS. 11 and 12 for controlling the machine and similar independent circuits would be provided for each of the several machine tools in the production line.

It is also contemplated that in a fully automated production line the automatic setup mechanism 95 and the drive unit 90 may be shuttled off of the ways 21 and 22 out of the paths of travel of the workpieces so that the latter may be transferred from one station to another automatically for the performance of machining operations on them. As an alternative arrangement separate paths of travel may be provided for the workpieces and the automatic setup mechanism 95 with its cooperating drive unit 90, as it is not necessary that the workpieces and the automatic setup mechanism 95 be supported on the same ways. Although the illustrated embodiment includes several manually operated switches for moving the automatic setup mechanism 95 with its drive unit 90 to and from the operating station and for clamping the drive unit 90 in position as well as for initiating the position and feed cycles, it is to be understood that the mechanism can readily be arranged to initiate these functions automatically if desired.

From the foregoing detailed description of the illustrative embodiment set forth herein to exemplify the present invention, it will be apparent that there has been provided an improved machine tool incorporating an automatic setup mechanism for positioning the several spindles of a multiple spindle head as well as automatically adjusting the feed cycle for the machining operation to be performed with the multiple spindle head being especially adapted for cooperation with the automatic setup mechanism for achieving the ultimate in automatic machine tool operation.

Although the illustrated embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, I hereby claim as my invention:

1. In a multiple spindle machine tool; a frame; a plurality of spindles carried by said frame and individually movable laterally in said frame for adjusting their positions relative to each other to collectively form different patterns; power means operable to actuate each of said spindles in their individual lateral movement; a record containing data indicating the lateral position of each of said spindles in said frame for obtaining a desired pattern; and control means connected to regulate the operation of said power means and operated by the data obtained from said record for individually laterally positioning said spindles to different relative locations to obtain the desired pattern of spindle placement.

2. In a multiple spindle machine tool; a spindle head; a plurality of spindles supported by said head and positionable relative to each other into different patterns; a movable setup mechanism operable to independently grip each of said spindles and move the gripped spindle into predetermined position; power means connected to actuate said setup mechanism for gripping and moving said spindles; a record containing information in regard to the positioning of said spindles into a desired pattern; and a control circuit connected to receive the information from said record and to regulate the operation of said power means in response to said information for actuating said setup mechanism in the manner required to effect the desired positioning of said spindles for obtaining the prescribed pattern of spindle placement.

3. In a production line containing a plurality of power operated machine tools; an independent control circuit for each of the machine tools, each of said independent control circuits being connected to control the operation of its associated machine tool; adjusting means associated with each of said control circuits for adjusting said control circuits to individually vary the machining cycle for said machine tools; power means operable to actuate said adjusting means for setting the cycle of operation of each of the machine tools; a record containing information pertaining to the actuation of said adjusting members; and a single control circuit connected to receive the information from said record and to regulate the operation of said power means in response to said information to automatically actuate each of said adjusting members for producing the desired machining cycle on each of the machine tools.

4. In a production line containing a plurality of power operated machine tools; a separate control means associated with each of the machine tools for individually regulating the machining cycle of its associated machine tool; power actuated adjusting means operable to individually adjust each of said separate control means for establishing the machining cycle of their associated machine tools; a record containing data representing the operation of said power actuated adjusting means; and a single control means connected to receive the data from said record and to regulate the operation of said adjusting means in response to the data received from said record for individually adjusting each of said separate control means to establish separate machining cycles for each of the machine tools.

5. In a production line containing a plurality of power operated machine tools; a base; an independent control circuit for each of the machine tools connected to control the operation of its associated machine tool to establish the machining program for the machine tool, each of said independent control circuits being adjustable to vary the machining program of the machine tool for performing different machining operations; a power operated setup mechanism operable to adjust said several independent control circuits for changing the machining program of each of the machine tools to perform different machining operations; a source of predetermined data; and a single separate control circuit responsive to and operated by said predetermined data and connected to regulate the operation of said setup mechanism in accordance with the predetermined data for adjusting said independent control circuits to vary the machining programs of the associated machine tools.

6. In a multiple spindle machine tool; a frame; a plurality of power driven spindles; means mounting said spindles in said frame and providing for their individual lateral adjustment in all directions to effect a group pattern of machining; power means for laterally adjusting said spindles individually relative to each other and including control means to regulate said power means for coordinating all of said individual lateral adjustments to create a desired group pattern.

7. In a multiple spindle machine tool; a frame; a plurality of power driven spindles; means mounting said spindles in said frame and providing for their individual lateral adjustment in all directions to effect a group pattern of machining; power means for laterally adjusting said spindles individually relative to each other and including control means to regulate said power means for coordinating all of said individual lateral adjustments to create a desired group pattern; and means locking said spindles in adjusted positions.

8. In a multiple spindle machine tool; a frame; a plurality of power driven spindles mounted in said frame for collective movement toward a workpiece to effect a group pattern of machining, said mounting for said spindles providing for lateral adjustment of each spindle to create a group pattern of machining as desired; lock means for rigidly fixing said spindles in adjusted position; control means determining the lateral adjustments of each spindle to create a group pattern of machining as desired; and means actuated by said control means for deactivating said lock means, for laterally adjusting said spindles individually to obtain said desired pattern, and to activate said lock means.

9. In a multiple spindle machine tool; a frame; a plurality of power driven spindles mounted in said frame for collective movement toward a workpiece to effect a group pattern of machining, said mounting for said spindles providing for lateral adjustment of each spindle to create a group pattern of machining as desired; cycle means to adjust the rotation and feed rate of said spindles; lock means for rigidly fixing said spindles in adjusted position; control means determining the lateral adjustments of each spindle to create a group pattern of machining as desired; and means actuated by said control means for deactivating said lock means, for laterally adjusting said spindles individually to obtain said desired pattern, and to activate said lock means, and to adjust said cycle means.

10. In a multiple spindle machine tool; a frame; a plurality of power driven spindles mounted in said frame for collective movement toward a workpiece to effect a group pattern of machining, said mounting for said spindles providing for individual lateral adjustment of said spindles relative to each other to change the group pattern; control means determining the lateral adjustments of each spindle to create a group pattern of machining as desired; and means actuated by said control means for laterally adjusting said spindles individually to obtain said desired pattern.

11. In a machine; a frame; a plurality of tools mounted in said frame for collectively effecting a group pattern of operation, said mounting of said tools providing for individual lateral adjustment of each of said tools relative to the other tools to change to a new group pattern; control means determining the lateral adjustments of each tool to create a group pattern as desired; and means actuated by said control means for laterally adjusting said tools individually to obtain said desired pattern.

12. In a multiple spindle machine tool; a frame; a plurality of power driven spindles; means mounting said spindles in said frame and providing for their lateral adjustment to effect a group pattern of machining; means to lock said spindles in adjusted position; a grip for adjusting said spindles; control means automatically determining the lateral adjustment of each spindle to create a group pattern of machining as desired; means continuously and automatically actuated by said control means including means for causing said grip to grip a spindle; means for unlocking said lock means; means for actuating said grip to adjust the spindle to the desired location; means to cause said grip to release the spindle; means to lock said lock means with respect to the spindle; and means causing said continuously and automatically actuated means to proceed to each spindle, unlock its adjustment, adjust it to the desired location, and lock it in adjusted position to create the group pattern determined by said control means.

13. A multiple spindle machine tool having a plurality of spindles extending from one face of said machine tool; means mounting each of said spindles for lateral adjustment in directions parallel to the plane of said face; cyclic controls for said machine tool including control members extending from said front face; means attachable to each of said spindles and to each of said members; and control means causing said attachable means to attach itself to and to adjust each of said spindles and members in turn, said control means including means coordinating said spindle adjustments to create a predetermined pattern of machining and coordinating said member adjustment to create a predetermined cycle of operation.

14. In a machine tool; a frame; a plurality of spindles projecting from one face of the frame; means mounting each spindle for individual lateral adjustment; a trackway extending parallel to said face; a set up mechanism movable along the trackway to a position in front of the projected spindles, said set up mechanism providing a grip adapted to grip each spindle sequentially; and means to actuate said grip to grip a spindle and to move said grip in directions parallel to said face to laterally adjust the gripped spindle.

References Cited by the Examiner
UNITED STATES PATENTS

| | | | |
|---|---|---|---|
| 561,346 | 6/96 | Schiefer | 77—23 |
| 766,748 | 8/04 | Vauclain | 77—62 |
| 1,594,429 | 8/26 | Rusnak | 77—24 |
| 2,293,464 | 8/42 | Hiruman | 77—24 |
| 2,679,940 | 6/54 | Goertx et al. | |
| 2,757,560 | 8/56 | Ridgway | 77—22 |
| 2,838,963 | 6/58 | Good et al. | |
| 2,974,548 | 3/61 | Miller | 77—22 |
| 3,051,328 | 8/62 | Brown et al. | |

FOREIGN PATENTS 781,465  8/57  Great Britain.

OTHER REFERENCES

"Vehicular Mechanical Arm Systems," Bulletin 6-B130, by General Mills Corporation, 1960.

WILLIAM W. DYER, Jr., *Primary Examiner.*

JOHN C. CHRISTIE, FRANK E. BAILEY, FRANK H. BRONAUGH, *Examiners.*